United States Patent
Itoh et al.

(10) Patent No.: US 6,725,679 B2
(45) Date of Patent: Apr. 27, 2004

(54) VEHICLE AIR CONDITIONER WITH DEFROSTING OPERATION OF EXTERIOR HEAT EXCHANGER

(75) Inventors: Satoshi Itoh, Kariya (JP); Motohiro Yamaguchi, Hoi-gun (JP); Yoshitaka Tomatsu, Chiryu (JP); Toshio Hirata, Haguri-gun (JP); Yasushi Yamanaka, Nakashima-gun (JP); Keita Honda, Okazaki (JP); Kunio Iritani, Anjo (JP)

(73) Assignee: Denso Corporation, Kariya (JP)

( * ) Notice: Subject to any disclaimer, the term of this patent is extended or adjusted under 35 U.S.C. 154(b) by 287 days.

(21) Appl. No.: 09/961,515

(22) Filed: Sep. 20, 2001

(65) Prior Publication Data

US 2002/0036080 A1 Mar. 28, 2002

(30) Foreign Application Priority Data

Sep. 27, 2000 (JP) .......................... 2000-294514
Mar. 30, 2001 (JP) .......................... 2001-101599

(51) Int. Cl.⁷ ................ F25B 13/00; B60H 1/00
(52) U.S. Cl. .............. 62/160; 62/151; 62/156; 62/278; 237/2 B; 165/240
(58) Field of Search .............. 62/160, 151, 155, 62/156, 140, 82, 278, 277; 237/2 B; 165/231, 232, 233, 240, 241, 242

(56) References Cited

U.S. PATENT DOCUMENTS

| 4,821,792 A | * | 4/1989 | Bednarek ............... 165/240 |
| 5,332,028 A | * | 7/1994 | Marris ..................... 62/160 |
| 5,704,217 A | | 1/1998 | Itoh et al. |
| 5,758,507 A | * | 6/1998 | Schuster et al. ........ 62/278 |
| 5,878,810 A | * | 3/1999 | Saito et al. ............. 62/160 |

FOREIGN PATENT DOCUMENTS

| JP | A-10-166846 | 6/1998 |
| JP | A-10-175415 | 6/1998 |

* cited by examiner

*Primary Examiner*—Harry B. Tanner
(74) *Attorney, Agent, or Firm*—Harness, Dickey & Pierce, PLC

(57) ABSTRACT

In a vehicle air conditioner with a heat pump cycle having an interior heat exchanger and an exterior heat exchanger, when a frosting on a surface of the exterior heat exchanger is determined and when a temperature of hot water supplied to a heater core is equal to or higher than a predetermined temperature, the exterior heat exchanger is defrosted in a defrosting operation. Accordingly, the defrosting operation can be performed while a sufficient heating can be obtained.

20 Claims, 17 Drawing Sheets

VEHICLE AIR CONDITIONER WITH DEFROSTING OPERATION OF EXTERIOR HEAT EXCHANGER

CROSS-REFERENCE TO RELATED APPLICATION

This application is related to and claims priority from Japanese Patent Applications No. 2000-294514 filed on Sep. 27, 2000 and No. 2001-101599 filed on Mar. 30, 2001, the contents of which are hereby incorporated by reference.

BACKGROUND OF THE INVENTION

1. Field of the Invention

The present invention relates to a vehicle air conditioner including a heater core that uses waste heat generated in a heat pump cycle and a vehicle as a heating source, and it is suitably applied to an electric vehicle.

2. Description of Related Art

When a heating operation is performed in a conventional heat pump cycle (heat pump), it is well known that a surface of an exterior heat exchanger is frosted. However, when the heat pump is operated while the surface of the exterior heat exchanger is frosted, heat-absorbing efficiency of the exterior heat exchanger is deteriorated. In JP-A-10-166846, therefore, high-temperature refrigerant discharged from a compressor is supplied to the exterior heat exchanger to defrost the surface of the exterior heat exchanger. However, a heating operation cannot be performed while refrigerant discharged from the compressor is supplied to the exterior heat exchanger (i.e., during defrosting operation).

On the other hand, in JP-A-9-142139, when frosting on the surface of the exterior heat exchanger is detected, the frosting is restricted from proceeding by reducing an air amount blown to an interior heat exchanger or the like. Accordingly, a time of starting the defrosting operation is delayed, thereby lengthening a time (heating continuation time) for which a heating operation can be performed. When the operation of the heat pump cycle is continued while the surface of the exterior heat exchanger is frosted, the heat pump cycle is operated in a state where heat pump efficiency is degraded. Therefore, consumption power of the heat pump cycle (compressor) is increased.

Further, in JP-A-10-175415, a heater core using waste heat is provided in addition to the heat pump cycle, so that a heating operation can be performed even during a defrosting operation. In a vehicle, having a relatively small amount of waste heat, such as an electric vehicle, however, sufficient heating may be not obtained during the defrosting operation.

SUMMARY OF THE INVENTION

In view of the foregoing problems, it is an object of the present invention to provide a vehicle air conditioner which can obtain a sufficient heating even in a defrosting operation.

According to an aspect of the present invention, in a vehicle air conditioner, a heater pump cycle includes a compressor for compressing and discharging refrigerant, an interior heat exchanger for performing a heat exchange between refrigerant and air blown into a passenger compartment of the vehicle, and an exterior heat exchanger for performing a heat exchange between refrigerant and outside air outside the passenger compartment. A heat core is disposed for heating air blown into the passenger compartment by performing a heat exchange between air and a fluid which recovers waste heat generated in the vehicle. The vehicle air conditioner has frosting determination means for determining whether a surface of the exterior heat exchanger is frosted, heating capacity determining means for determining whether a heating capacity of the heater core is larger than a predetermined capacity, and a control unit for controlling operation of the heat pump cycle. In the vehicle air conditioner, at least when the frosting determination means determines a frosting on the surface of the exterior heat exchanger, and when the heating capacity determining means determines that the heating capacity of the heater core is larger than the predetermined capacity, the control unit performs a defrosting operation in which the surface of the exterior heat exchanger is defrosted. Accordingly, even in the defrosting operation, a sufficient heating can be obtained. Because the defrosting operation is performed while a sufficient heating is obtained, it can prevent the heat pump cycle from operating with a large power, and consumed power in the compressor can be reduced in the heating operation. In the present invention, when the heating capacity of the heater core is larger than the predetermined capacity, it can be determined that heating capacity of the heater core is sufficient for heating the passenger compartment.

According to an another aspect of the present invention, in a vehicle air conditioner, a ratio adjusting unit is disposed for adjusting a ratio of an air amount introduced through an inside air introduction port to an air amount introduced through an outside air introduction port, and frosting determination means for determining whether a surface of the exterior heat exchanger is frosted is provided. In this case, at least when the frosting determination means determines a frosting on the surface of the exterior heat exchanger, the control unit performs a defrosting operation in which the surface of the exterior heat exchanger is defrosted, and the ratio adjusting unit increases the ratio of the inside air amount introduced through the inside air introduction port. Accordingly, in the defrosting operation, a heat load of the heater core can be made smaller, and a sufficient heating can be obtained. That is, in the defrosting operation for defrosting the exterior heat exchanger, the heating capacity of the heater core is increased. In the present invention, the heating capacity of the heater core can be increased, by heating the fluid supplied to the heater core, by reducing a flow amount of the fluid, by increasing a rotation speed of an engine, by stopping operation of a blower for blowing outside air toward a radiator that cools the fluid, by increasing an output of a fuel cell, or the like.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention will be described hereinafter with reference to the accompanying drawings.

(First Embodiment)

In the first embodiment, a vehicle air conditioner according to the present invention is typically used for an electric vehicle having a fuel cell (FC stack) as a power supply. The first embodiment will be now described with reference to FIGS. 1–5.

Figure 1:
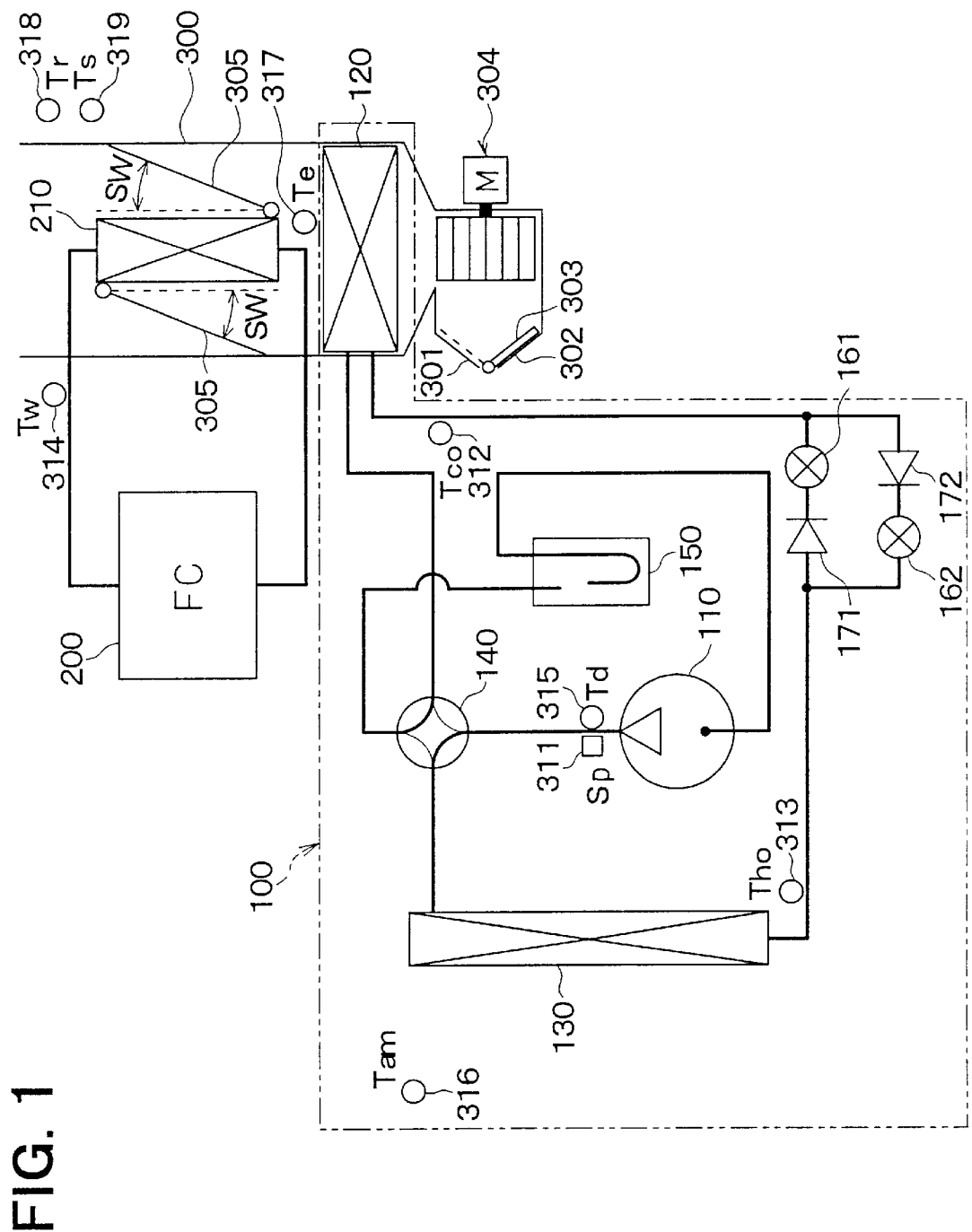
FIG. 1 is a schematic diagram showing an air conditioner with a heater pump cycle according to a first preferred embodiment of the present invention.

In FIG. 1, a heat pump cycle (heat pump) 100 enclosed by a two-dot chain line is disposed to switch an operation mode between a heating operation, a cooling operation and a defrosting operation, and a fuel cell (macromolecule-electrolyte type fuel cell) 200 is disposed to generate electric power by a chemical reaction between oxygen and hydrogen.

A compressor 110 (electric compressor) sucks and compresses refrigerant using an inverter control. An interior heat exchanger 120 is disposed to perform a heat exchange between refrigerant and air blown into a passenger compartment, and an exterior heat exchanger 130 is disposed to perform a heat exchange between refrigerant and outside air.

A four-way switching valve 140 is disposed to switch a refrigerant flow from the compressor 110 to the interior heat exchanger 120 or a refrigerant flow from the compressor 110 to the exterior heat exchanger 130. An accumulator (gas-liquid separator tank) 150 is disposed to separate refrigerant into gas refrigerant and liquid refrigerant. The accumulator 150 accumulates therein liquid refrigerant which is surplus refrigerant in the heat pump cycle 100, while introducing gas refrigerant to a suction side of the compressor 110.

An electric cooling decompression device 161 is disposed to decompress refrigerant flowing out from the exterior heat exchanger 130 in the cooling operation, and an electric heating decompression device 162 is disposed to decompress refrigerant flowing out from the interior heat exchanger 120 in the heating operation. Opening degrees of these decompression devices (decompression valves) 161, 162 are controlled by an electronic control unit (ECU) described later.

A first check valve 171 is disposed to prevent refrigerant from passing through the cooling decompression device 161 in the heating operation, and a second check valve 172 is disposed to prevent refrigerant from passing through the heating decompression device 162 in the cooling operation.

An air conditioning case 300 is disposed to define an air passage through which air is blown into the passenger compartment. The air conditioning case 300 has an inside air introduction port 301 through which inside air inside the passenger compartment is introduced and an outside air introduction port 302 through which outside air outside the passenger compartment is introduced, at upstream air side thereof. An inside/outside switching door 303 is disposed to selectively open and close the inside air introduction port 301 and the outside air introduction port 302, and a centrifugal type blower 304 is disposed to blow air into the passenger compartment through the air passage of the air conditioning case 300.

The interior heat exchanger 120 of the heat pump cycle 100 is disposed at a downstream air side of the blower 304 in the air conditioning case 300. A heater core 210, for heating air by using cooling water (fluid) having recovered waste heat generated from the fuel cell 200, is disposed at a downstream air side of the interior heat exchanger 120 in the air conditioning case 300.

An air mixing door (air temperature adjusting means) 305 adjusts temperature of air to be blown into the passenger compartment by adjusting a ratio between a flow amount of air (warm air heated by the cooling water) passing through the heater core 210 and a flow amount of air (cool air) bypassing the heater core 210.

At a downstream air side of the air mixing door 305 (heater core 210), the air conditioning case 300 has a face port through which conditioned air is blown toward the upper half body of a passenger, a foot port through which conditioned air is blown toward the foot area of the passenger, and a defroster port through which air is blown toward an inner surface of a windshield. Mode switching doors for opening and closing the ports are disposed at an upstream air side of the ports, respectively, in the air conditioning case 300.

Figure 2:
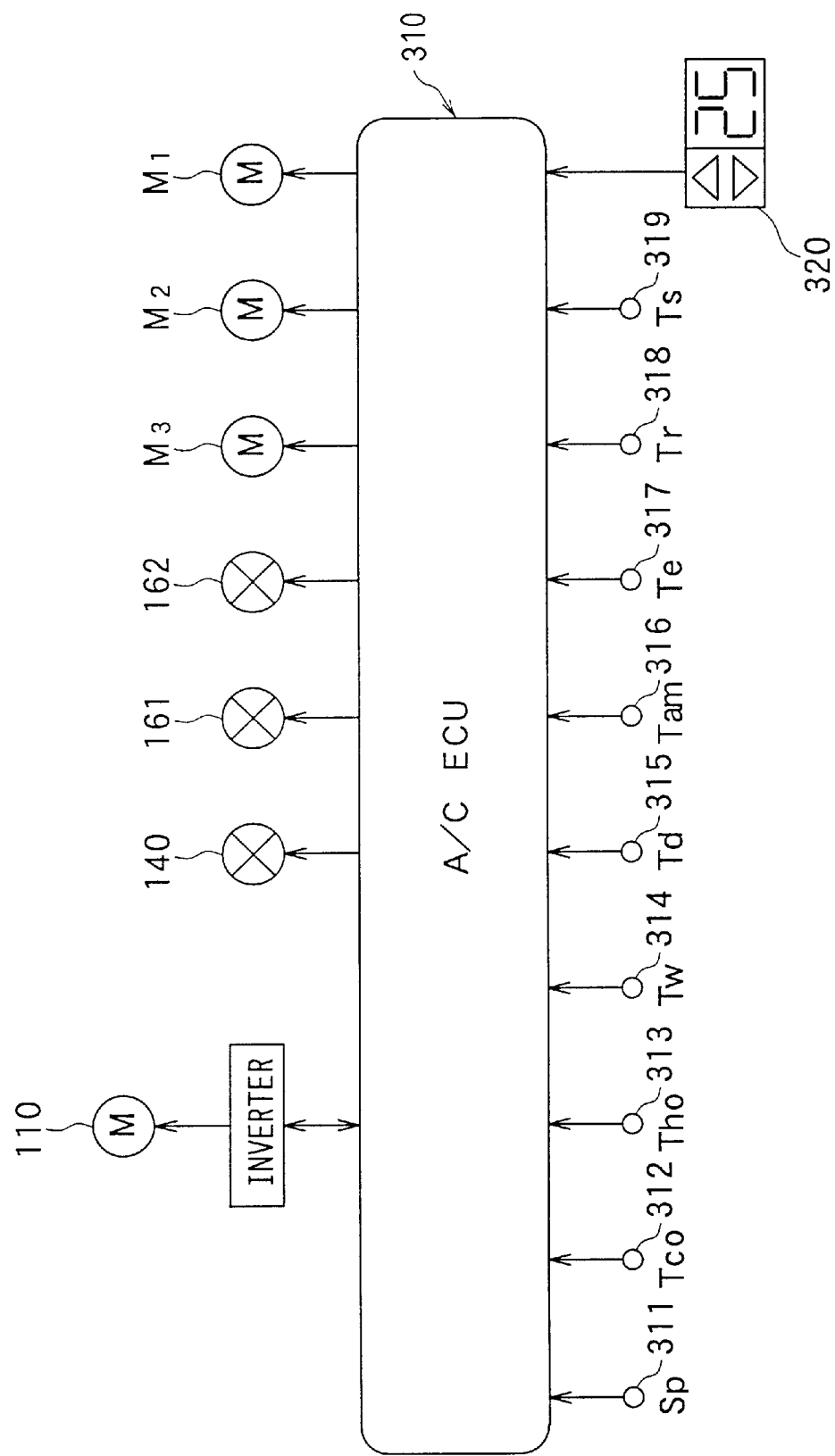
FIG. 2 is a schematic diagram showing a control system of the air conditioner according to the first embodiment.

The mode switching doors, the air mixing door 305 and the inside/outside switching door 303 are driven by servomotors (driving means) M1–M3, respectively, and these servomotors M1–M3 and an electric motor M4 of the blower 304 are controlled by the electronic control unit (ECU) 310 as shown in FIG. 2.

Detection values from a sensor group and a set value set on a temperature control panel 320 are inputted to the ECU 15, 310. The set value is a temperature of the passenger compartment, requested by a passenger. The sensor group includes a discharge pressure sensor (discharge pressure detection means) 311 for detecting a pressure Sp of refrigerant discharged from the compressor 110, an interior outlet refrigerant temperature sensor (interior outlet refrigerant temperature detection means) 312 for detecting a temperature Tco of refrigerant flowing out from the interior heat exchanger 120, an exterior outlet refrigerant temperature sensor (exterior outlet refrigerant temperature detection means) 313 for detecting a temperature Tho of refrigerant flowing out from the exterior heat exchanger 130, a water temperature sensor (water temperature detection means) 314 for detecting a temperature Tw of cooling water (hot water) supplied to the heater core 210, a discharge refrigerant temperature sensor (discharge refrigerant temperature detection means) 315 for detecting a temperature Td of refrigerant discharged from the compressor 110, an outside temperature sensor (outside temperature detection means) 316 for detecting a temperature Tam of outside air, an interior air temperature sensor (interior air temperature detection means) 317 for detecting a temperature Te of air immediately after passing through the interior heat exchanger 120, an inside air temperature sensor (inside temperature detection means) 318 for detecting a temperature Tr of inside air, and a solar radiation sensor (solar radiation intensity detection means) 319 for detecting a solar radiation intensity Ts entering into the passenger compartment.

Using the detection values from the sensors 311–319 and a set temperature Tset on the temperature control panel 320, the ECU 310 controls the mode switching doors (servomotor M1), the air mixing door 305 (servomotor M2), the inside/outside switching door 303 (servomotor M3), the blower 304 (electric motor M4), the decompression devices 161, 162, the four-way switching valve 140 and the compressor 110 based on a preset program.

Next, description will be made on operations according to the first embodiment.

1. Cooling Operation

Figure 3:
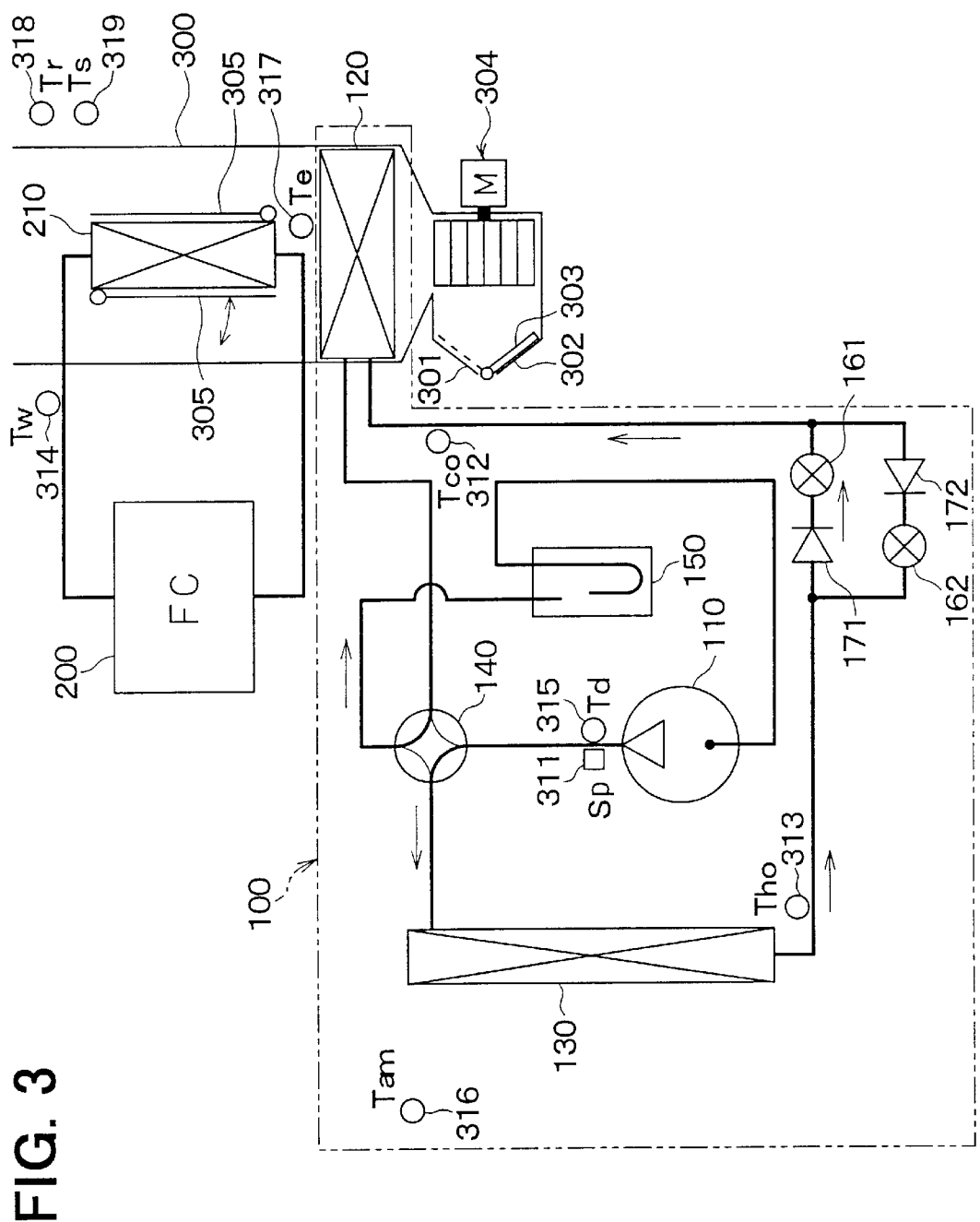
FIG. 3 is a schematic diagram showing the air conditioner in a cooling operation, according to the first embodiment.

When a cooling operation switch (not shown) is turned on, refrigerant discharged from the compressor 110 flows into the exterior heat exchanger 130 while all air having passed through the interior heat exchanger 120 bypasses the heater core 210 by closing core surfaces of the heater core 210 using the air mixing door 305, as shown in FIG. 3. Accordingly, refrigerant circulates in the heat pump cycle 100 from the compressor 110 to compressor 110 through the exterior heat exchanger 130, the cooling decompression device 161, the interior heat exchanger 120 and the accumulator 150 in this order. Therefore, refrigerant is cooled by outside air to be condensed in the exterior heat exchanger 130, and the condensed refrigerant is evaporated in the interior heat exchanger 120 by absorbing heat from air to be blown into the passenger compartment. Thus, air passing through the interior heat exchanger 120 is cooled.

In the air conditioning case 300, since air cooled in the interior heat exchanger 120 bypasses the heater core 210, cool air cooled in the interior heat exchanger 120 is supplied into the passenger compartment. At this time, the temperature of air to be blown into the passenger compartment can be controlled by controlling the operation (e.g., revolution speed) of the compressor 110 as follows.

First, a target temperature (i.e., target air temperature TAO) of air blown into the passenger compartment, that is, a target temperature of air immediately after passing through the interior heat exchanger 120 (target post-air temperature TEO) is calculated based on the following formula (1) using the set temperature Tset, the inside air temperature (temperature detected by the inside temperature sensor 318) Tr, an outside air temperature (temperature detected by the outside temperature sensor 316) Tam and the solar radiation amount entering into the passenger compartment (detection value from the solar radiation sensor 319) Ts.

$$TEO(TAO)=Kset \times Tset - Kr \times Tr - Kam \times Tam - Ks \times Ts + C \quad (1)$$

wherein, Kset, Kr, Kam and Ks are control gains, and C is a correction constant.

Then, the rotation speed of the compressor 110 is controlled through the inverter so that the temperature Te (temperature detected by the interior air temperature sensor 317) of air immediately after passing through the interior heat exchanger 120 becomes the temperature TEO.

2. Heating Operation

The heating operation of the air conditioner will be now described with reference to the flow diagram in FIG. 4.

When a heating operation switch of the air conditioner is turned on, detection signals from the sensors 311–319 are inputted into the ECU 310 at step S100. The ECU 310 calculates a target temperature (TAO) of air immediately after passing through the heater core 210, that is, a target water temperature TWO, based on the following formula (2) using the inputted detection values, at step S110.

$$TWO(TAO)=Kset \times Tset - Kr \times Tr - Kam \times Tam - Ks \times Ts + C \quad (2)$$

wherein, Kset, Kr, Kam and Ks are control gains, and C is a correction constant. Although the formula (1) is identical with the formula (2), each value of Kset, Kr, Kam, Ks and C is different between the formulas (1) and (2).

Then, it is determined whether the temperature Tw (temperature detected by the water temperature sensor 314) of hot water supplied to the heater core 210 is equal to or higher than the calculated temperature TWO at step S120. When the temperature Tw is equal to or higher than the temperature TWO, it is determined that the passenger compartment can be sufficiently heated using waste heat from the fuel cell 200. Then, an opening degree SW of the air mixing door 305 is determined, and the ratio between the flow amount of warm air and the flow amount of cool air is controlled by the air mixing door 305, thereby adjusting the temperature of air to be blown into the passenger compartment, at step S130.

On the other hand, when the target water temperature TWO is higher than the water temperature Tw, it is determined that the passenger compartment cannot be sufficiently heated using waste heat from the fuel cell 200. In this case, a supplement heating capacity of the heat pump cycle 100, required for supplementing the heating of the heater core 210, is calculated by using a difference between the target water temperature TWO and the water temperature Tw at step S140. Next, at step S150, the rotation speed of the compressor 110 is controlled through the inventer so that the temperature Te (temperature detected by the interior air temperature sensor 317) of air immediately after passing through the interior heat exchanger 120 becomes a temperature corresponding to the heating capacity (required supplement heating capacity) of the heat pump cycle 100 calculated at the step S140.

In this case, refrigerant circulates from the compressor 110 to the compressor 110 through the interior heat exchanger 120, the heating decompression device 162, the exterior heat exchanger 130 and the accumulator 150 in this order. The refrigerant is condensed in the interior heat exchanger 120 by radiating heat to air to be blown into the passenger compartment, and the condensed refrigerant is evaporated at the exterior heat exchanger 130 by absorbing heat from outside air. Therefore, air passing through the interior heat exchanger 120 is heated.

Further, the air mixing door 305 is opened so that all air having passed through the interior heat exchanger 120 passes through the heater core 210 without bypassing the heater core 210.

Next, at step S160 (frosting determination means), it is determined whether or not the surface of the exterior heat exchanger 130 is frosted based on the outside air temperature Tam, the refrigerant temperature (temperature detected by the exterior outlet refrigerant temperature sensor 313) Tho and the like. When it is determined that the surface of the exterior heat exchanger 130 is not frosted, the operation of the compressor 110 is continuously performed.

When it is determined that the surface of the exterior heat exchanger 130 is frosted at the step S160, the water temperature Tw is read at step S170. At step S180 (heating capacity determination means), it is determined whether a temperature difference between the target water temperature TWO and the water temperature Tw read at the step S170 is larger than a predetermined temperature difference C3.

In the first embodiment, when a temperature difference ΔT (Tam−Tho) between the outside air temperature Tam and the exterior outlet refrigerant temperature Tho is larger than a predetermined temperature difference C2 (e.g., 18° C., in the first embodiment) and this condition continues for a predetermined time T1, the frosting on the surface of the exterior heat exchanger 130 can be determined.

When the temperature difference between the target water temperature TWO and the water temperature Tw is larger than the predetermined temperature difference C3, that is, when the water temperature Tw is lower than a predetermined temperature Tf determined by the set temperature Tset and the like, it is determined that this heating operation cannot be maintained by hot water supplied from the fuel cell 200, and the operation of the compressor 110 is continuously performed.

When the temperature difference (TWO−Tw) is equal to or smaller than the predetermined temperature difference C3, that is, when the water temperature Tw is equal to or larger than the predetermined temperature Tf, it is determined that this heating operation can be maintained by hot water supplied from the fuel cell 200. In this case, a defrosting operation is performed at step S190.

In this defrosting operation, similarly to that in the cooling operation, refrigerant circulates from the compressor 110 to the compressor 110 through the exterior heat exchanger 130, the cooling decompression device 161, the interior heat exchanger 120 and the accumulator 150 in this order.

Next, features of the air conditioner according to the first embodiment will be now described.

According to the first embodiment, when it is determined that the surface of the exterior heat exchanger 130 is frosted and the temperature of the water supplied to the heater core 210 is equal to or higher than a predetermined temperature, the defrosting of the exterior heat exchanger 130 is performed. Therefore, a sufficient heating feeling can be obtained even when the defrosting operation of the exterior As heat exchanger 130 is performed. Because the defrosting operation can be performed while sufficient heating feeling can be ensured, the heat pump cycle 100 (compressor 110) can be prevented from continuing an operation while its consumption power is increased, thereby restricting consumed electric power (motive power).

When the heat amount required for heating the passenger compartment can be sufficiently obtained from the fuel cell 200, the heating operation is performed only by using the heater core 210 without operating the heat pump cycle 100 (compressor 110). Therefore, a vehicle power source can be effectively used.

In the above-described first embodiment, when the frosting on the surface of the exterior heat exchanger 130 is determined and when the heating capacity of the heater core 210 is larger than a predetermined capacity, the defrosting operation is performed.

(Second Embodiment)

In the second embodiment, when frosting on the surface of the exterior heat exchanger 130 is determined, when the temperature of hot water supplied to the heater core 210 is equal to or higher than the predetermined temperature and when a vehicle speed Vs is equal to or higher than a predetermined speed Vso (e.g., 11 km/hour, in the second embodiment), the defrosting operation is performed.

Accordingly, frost is melted by the defrosting operation, and the melted water drops can be blown away by vehicle travelling wind. Therefore, when the heating operation is performed again after finishing the defrosting operation, water drops (frost) melted in the defrosting operation can be prevented from being freezed again, thereby lengthening a heating operation time.

Figure 6:
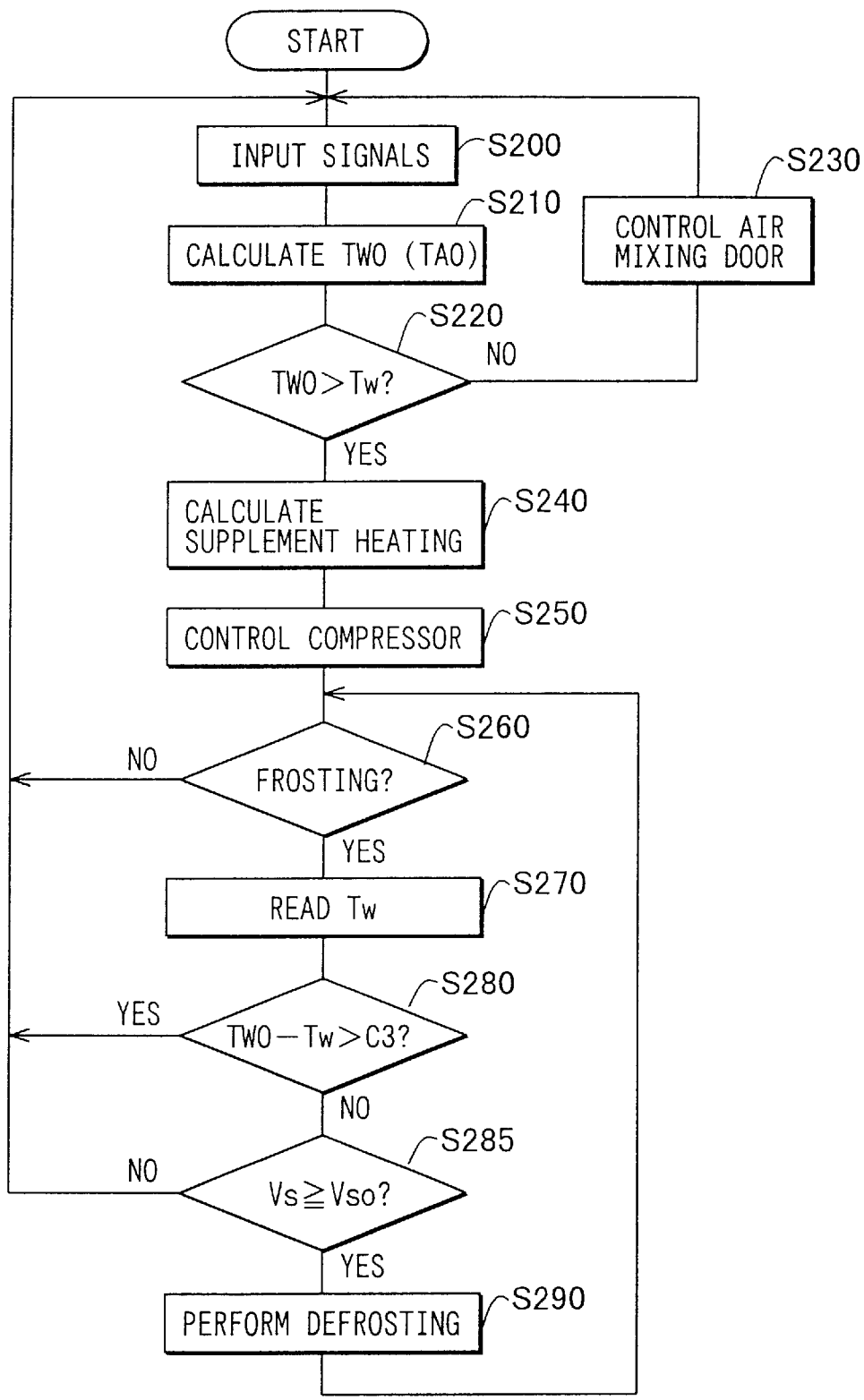
FIG. 6 is a flow diagram showing control operation of an air conditioner, according to a second preferred embodiment of the present invention.

Next, operation of a vehicle air conditioner according to the second embodiment will be described with reference to the flow diagram in FIG. 6.

When the heating operation switch is turned on, detection signals from the sensors 311–319 are inputted into the ECU 310 at step S200, and the target air temperature TAO (target water temperature TWO) is calculated based on the above-described formula (2) using the inputted detection signals, at step S210.

Then, it is determined whether the temperature Tw (temperature detected by the water temperature sensor 314) of hot water supplied to the heater core 210 is equal to or higher than the temperature TWO at step S220. When the temperature Tw is equal to or higher than the temperature TWO, it is determined that the passenger compartment can be sufficiently heated only using heat from the fuel cell 200. Then, the opening degree SW of the air mixing door 305 is determined, and the ratio between the flow amount of warm air and the flow amount of cool air is controlled by the air mixing door 305, thereby adjusting the temperature of air to be blown into the passenger compartment, at step S230.

When the target water temperature TWO is higher than the water temperature Tw, it is determined that the passenger compartment cannot be sufficiently heated only using waste heat from the fuel cell 200. In this case, the supplement heating capacity of the heat pump cycle 100 required for supplementing the heating of the heater core 210 is calculated by using the difference between the target water temperature TWO and the water temperature Tw, at step S240. At step S250, the rotation speed of the compressor 110 is controlled through the inverter so that the temperature Te detected by the interior temperature sensor 317 becomes a temperature corresponding to the required supplement heating capacity.

In this case, refrigerant circulates from the compressor 110 to the compressor 110 through the interior heat exchanger 120, the heating decompression device 162, the exterior heat exchanger 130 and the accumulator 150 in this order. Thus, the refrigerant is condensed in the interior heat exchanger 120 by radiating heat to air blown into the passenger compartment, and the condensed refrigerant is evaporated in the exterior heat exchanger 130 by absorbing heat from outside air. The air mixing door 305 is opened so that all air having passed through the interior heat exchanger 120 passes through the heater core 210 without bypassing the heater core 210.

Next, at step S260 (frosting determination means), it is determined whether the surface of the exterior heat exchanger 130 is frosted. When it is determined that the surface is not frosted, the operation of the compressor 110 continuously performed. On the other hand, when it is determined that the surface is frosted at the step S260, the ECU 310 reads the water temperature Tw at step S270. At step S280, it is determined whether a temperature difference between the target water temperature TWO and the water temperature Tw read at the step S270 is larger than a predetermined temperature difference C3.

When the temperature difference is larger than the predetermined temperature difference C3, it is determined that this heating operation cannot be maintained only by hot water supplied from the fuel cell 200, and the operation of the compressor 110 is continuously performed.

When the temperature difference (TWO–Tw) is equal to or smaller than the predetermined temperature difference C3, it is determined whether the vehicle speed Vs detected by a vehicle speed sensor is equal to or higher than a predetermined speed Vso (e.g., 10 km/hour in the second embodiment) at step S285. When the vehicle speed Vs is higher than the predetermined speed Vso, the defrosting operation is performed at step S290. When the vehicle speed Vs is lower than the predetermined speed Vso, control program returns to the step S200 from the step 285 without performing defrosting operation.

In the second embodiment, when the frosting on the surface of the exterior heat exchanger 130 is determined, when the temperature of hot water supplied to the heater core 210 is equal to or higher than the predetermined temperature and when the vehicle speed is higher than the predetermined speed, the defrosting operation of the exterior heat exchanger 130 is performed. Here, the predetermined speed can be set at zero.

(Third Embodiment)

When the vehicle speed is excessively high in defrosting operation, the exterior heat exchanger 130 is greatly cooled by vehicle travelling wind. Therefore, defrosting operation efficiency may be decreased, and power consumed in the compressor 110 for melting frost may be increased.

In the third embodiment, when the frosting on the surface of the exterior heat exchanger 130 is determined, when the temperature of hot water supplied to the heater core 210 is equal to or higher than the predetermined temperature, and when the vehicle speed Vs is higher than a first predetermined speed Vs1 (e.g., 10 km/hour in the third embodiment) and is lower than a second predetermined speed Vs2 (e.g., 40 km/hour in the third embodiment), the defrosting operation is performed.

Figure 7:
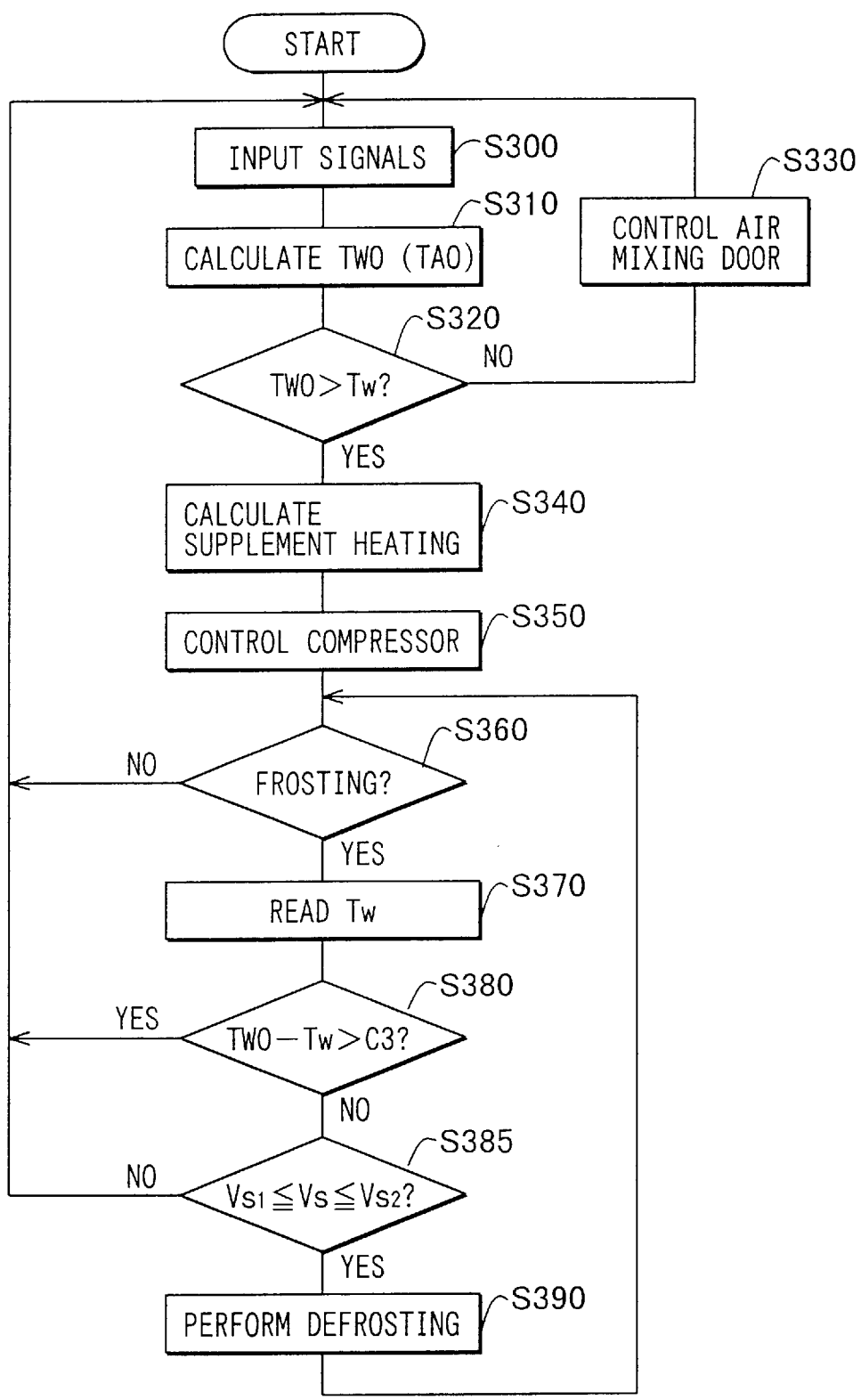
FIG. 7 is a flow diagram showing control operation of an air conditioner, according to a third preferred embodiment of the present invention.

Next, operation of a vehicle air conditioner according to the third embodiment will be described with reference to the flow diagram in FIG. 7.

When the heating operation switch is turned on, detection signals from the sensors 311–319 are inputted into the ECU 310 at step S300, and the target air temperature TAO (target water temperature TWO) is calculated based on the above-described formula (2) using the inputted detection signals, at step S310.

Then, it is determined whether the temperature Tw (temperature detected by the water temperature sensor 314) of hot water supplied to the heater core 210 is equal to or higher than the temperature TWO at step S320. When the temperature Tw is equal to or higher than the temperature TWO, it is determined that the passenger compartment can be sufficiently heated only using heat from the fuel cell 200. Then, the opening degree SW of the air mixing door 305 is determined, and the ratio between the flow amount of warm air and the flow amount of cool air is controlled by the air mixing door 305, thereby adjusting the temperature of air to be blown into the passenger compartment, at step S330.

When the target water temperature TWO is higher than the water temperature Tw, it is determined that the passenger compartment cannot be sufficiently heated only using waste heat from the fuel cell 200. In this case, the supplement heating capacity of the heat pump cycle 100 required for supplementing the heating of the heater core 210 is calculated by using the difference between the target water temperature TWO and the water temperature Tw, at step S340. At step S350, the rotation speed of the compressor 110 is controlled through the inverter so that the temperature Te detected by the interior temperature sensor 317 becomes a temperature corresponding to the required supplement heating capacity.

In this case, refrigerant circulates from the compressor 110 to the compressor 110 through the interior heat exchanger 120, the heating decompression device 162, the exterior heat exchanger 130 and the accumulator 150 in this order. Thus, the refrigerant is condensed in the interior heat exchanger 120 by radiating heat to air blown into the passenger compartment, and the condensed refrigerant is evaporated in the exterior heat exchanger 130 by absorbing heat from outside air. The air mixing door 305 is opened so that all air having passed through the interior heat exchanger 120 passes through the heater core 210 without bypassing the heater core 210.

Next, at step S360 (frosting determination means), it is determined whether the surface of the exterior heat exchanger 130 is frosted. When it is determined that the surface is not frosted, the operation of the compressor 110 is continuously performed. On the other hand, when it is determined that the surface is frosted at the step S360, the ECU 310 reads the water temperature Tw at step S370. At step S380, it is determined whether a temperature difference between the target water temperature TWO and the water temperature Tw read at the step S370 is larger than a predetermined temperature difference C3.

When the temperature difference is larger than the predetermined temperature difference C3, it is determined that this heating operation cannot be maintained only by hot water supplied from the fuel cell 200, and the operation of the compressor 110 is continuously performed.

On the other hand, when the temperature difference (TWO–Tw) is equal to or smaller than the predetermined temperature difference C3, it is determined whether a vehicle speed Vs is higher than the first speed Vs1 and is lower than the second speed Vs2 at step S385. When the vehicle speed Vs is higher than the first speed Vs1 and is lower than the second speed Vs2, the defrosting operation is performed at step S390. When the vehicle speed Vs is equal to or lower than the first speed Vs1 or is equal to or higher than the second speed Vs2, the control program returns to the step S300 from the step 385 without performing the defrosting operation.

(Fourth Embodiment)

Figure 4:
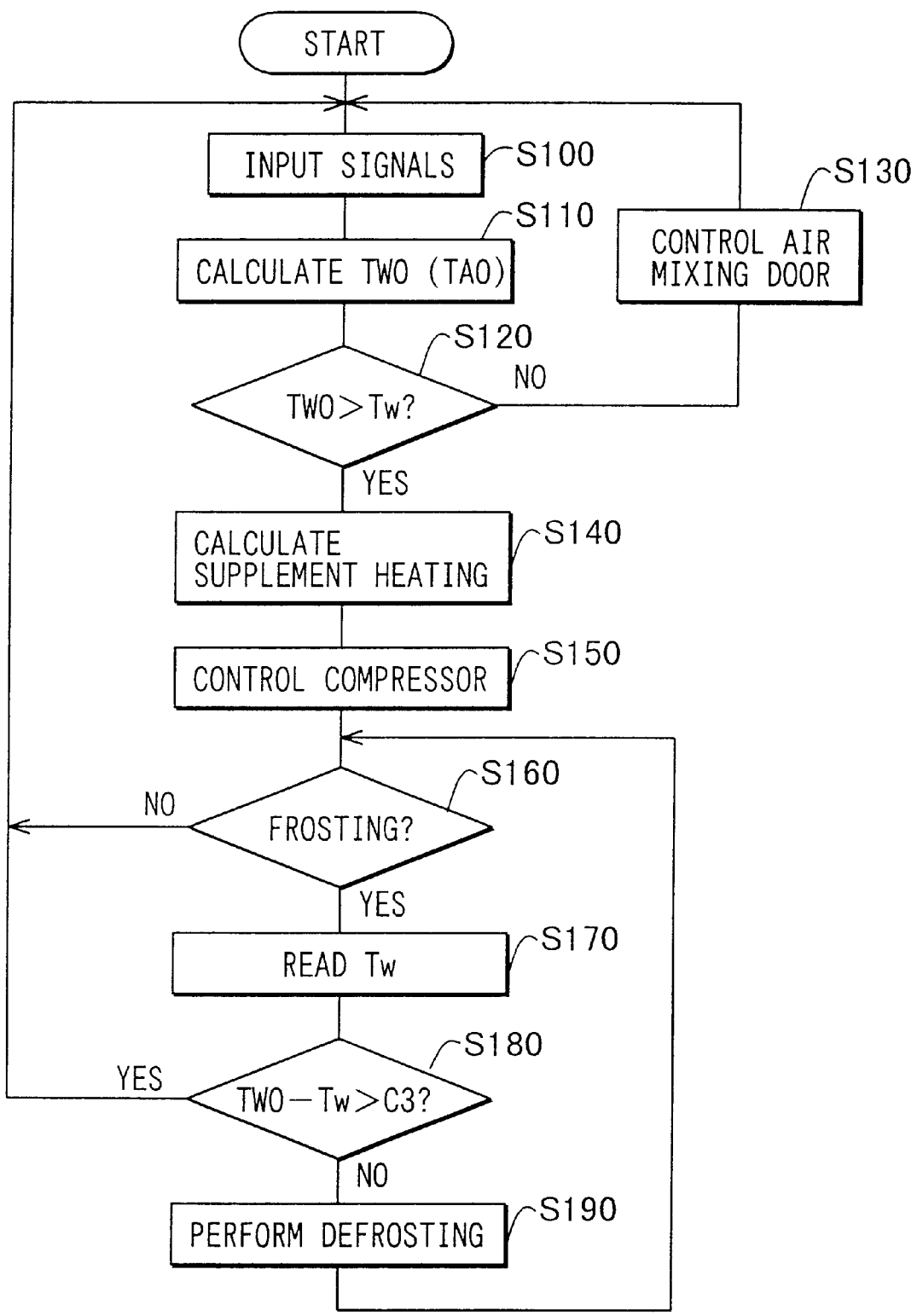
FIG. 4 is a flow diagram showing control operation of the air conditioner, according to the first embodiment.

In the above-described first embodiment, the vehicle air conditioner is controlled based on the flow diagram shown in FIG. 4. In the fourth embodiment, a vehicle air conditioner is controlled based on the flow diagram shown FIG. 8.

Figure 8:
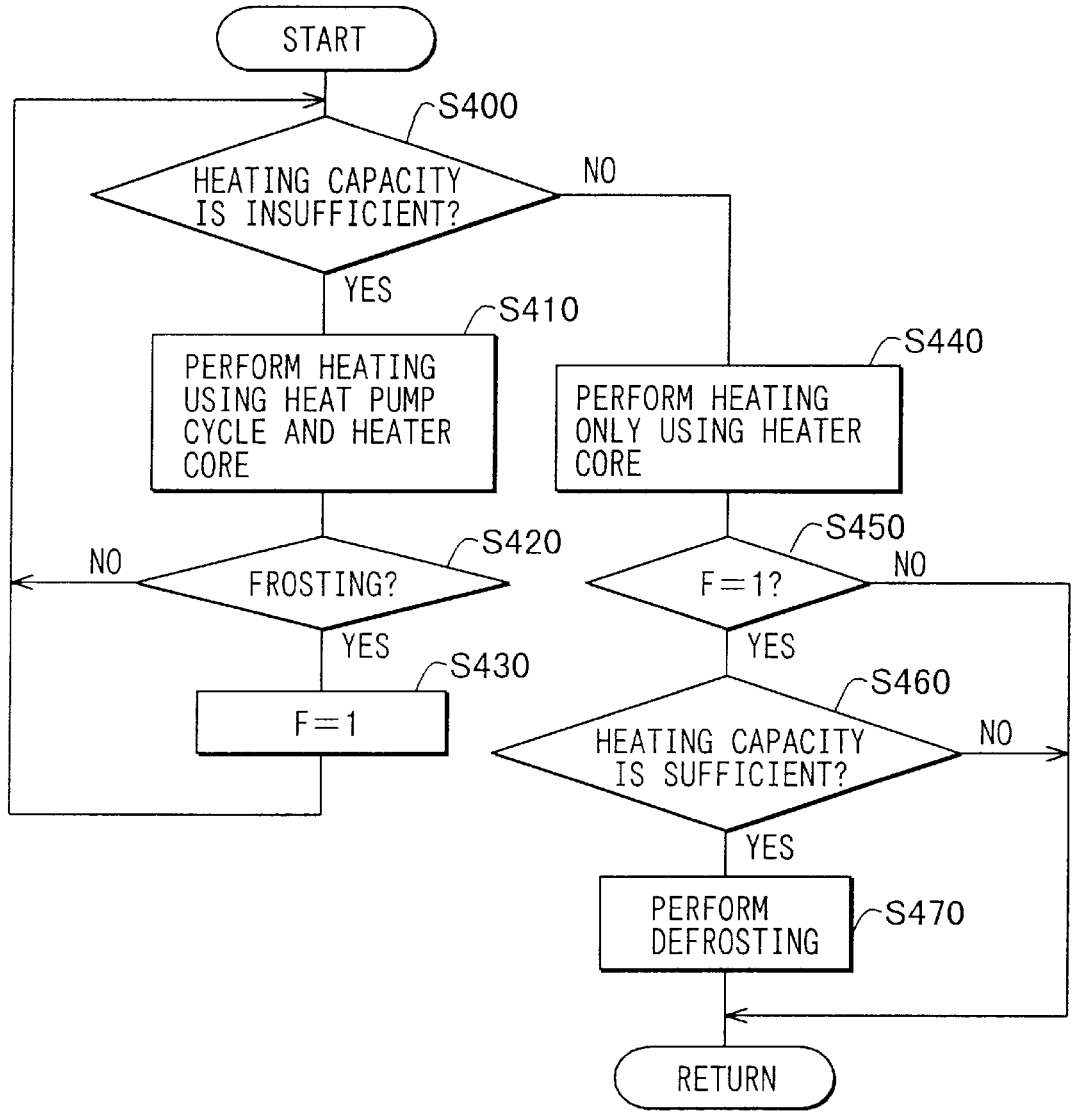
FIG. 8 is a flow diagram showing control operation of an air conditioner, according to a fourth preferred embodiment of the present invention.

When the heating operation switch is turned on, it is determined whether the heating capacity of the heater core 210 is smaller than a heating capacity required for heating the passenger compartment, corresponding to the set temperature Tset, at step S400. That is, at step S400, it is determined whether or not the heating capacity is insufficient for heating the passenger compartment based on the set temperature Tset. When the heating capacity of the heater core 210 is insufficient, a heating operation is performed using the heat pump cycle 100 and the heater core 210, at step S410. At step 420 (frosting determination means), it is determined whether or not the surface of the exterior heat exchanger 130 is frosted. When the frosting on the surface of the exterior heat exchanger 130 is determined, a defrosting flag F is set at "1" (F=1) at step S430. In the fourth embodiment, when the control program shown in FIG. 8 is started, the defrosting flag F is set at "0" (F=0).

When the heating capacity of the heater core 210 is sufficient for heating the passenger compartment to the set temperature Tset, it is determined that the passenger compartment can be sufficiently heated only using waste heat from the fuel cell 200, and the heating operation is performed only using the heater core 210 without operating the heat pump cycle 100 (compressor 110) at step S440. At step S450, it is determined whether or not the defrosting flag F is set at "1". When the defrosting flag F is determined to be set at "1" (i.e., F=1), it is determined whether the heating capacity of the heater core 210 is larger than a predetermined heating capacity required for heating air, cooled in the interior heat exchanger 120 during the defrosting operation, to the target air temperature TAO at step S460. That is, at step 460, it is determined whether or not the heating capacity of the heater core 210 is sufficient for heating the passenger compartment even in the defrosting operation in which air is cooled in the interior heat exchanger 120.

When the heating capacity of the heater core 210 is determined to be larger than the predetermined required heating capacity at the step S460, that is, when the heating capacity of the heater core 210 is determined to be sufficient at the step S460, the defrosting operation is performed at step S470. That is, when the heating capacity of the heater core 210 is determined not to be insufficient at the step 400, when the heating capacity of the heater core 210 is determined to be sufficient at step 460, and the defrosting flag F is set at "1" at the step S450, the defrosting operation is performed.

Next, description will be made on specific determination means at step S460 in the fourth embodiment.

For example, at step S460 in the fourth embodiment, when the temperature difference between the water temperature Tw and the target water temperature TWO is larger than the predetermined temperature C3 (Tw−TWO>C3) similarly to that at the step S180 in the first embodiment, it can be determined that the heating capacity of the heater core 210 is sufficient.

Figure 5:
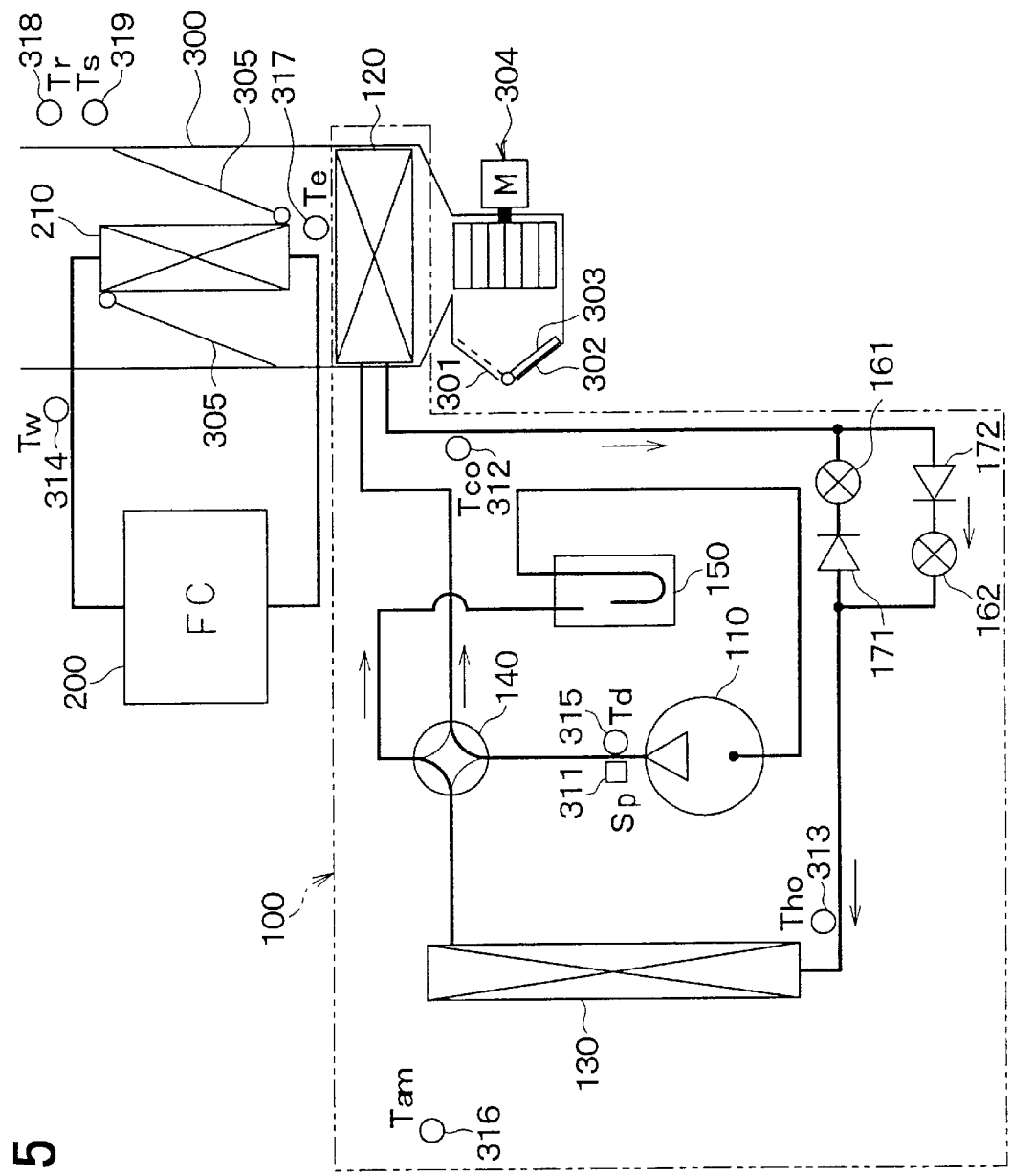
FIG. 5 is a schematic diagram showing the air conditioner in a heating operation, according to the first embodiment.

Further, at step S460 in the fourth embodiment, when the opening degree SW of the air mixing door 305 is not set at the maximum heating position shown in FIG. 5, it can be determined that the heating capacity of the heater core 210 is sufficient. Accordingly, in this case, when the air mixing door 305 moves from the maximum heating position shown in FIG. 5 toward the position shown in FIG. 3, the defrosting operation can be performed. Further, the air temperature adjusting means is not limited to the air mixing door 305 but may be well-known reheating means for adjusting a temperature of air to be blown into the passenger compartment by adjusting a flow amount of hot water supplied to the heater core 210. In this case, when the flow amount of hot water supplied to the heater core 210 is not maximum, it can be determined that the heating capacity of the heater core 210 is sufficient at step S460.

In a case where cooling water (hot water) for cooling an engine 400 (see FIG. 10) is supplied to the heater core 210, when the cooling water is cooled in a radiator by performing a heat exchange between the cooling water and outside air, it can be determined that the heating capacity of the heater core 210 is sufficient at step S460. In this case, when an operation state where the cooling water is not cooled in the radiator, is changed to an operation state where the cooling water is cooled in the radiator, the defrosting operation is performed.

Further, when the target air temperature TAO described in the first embodiment is equal to or lower than a predetermined temperature, it can be determined that the heating capacity of the heater core 210 is sufficient at step S460. Accordingly, when an operation state where the target blown air temperature TAO is higher than the predetermined temperature, is changed to an operation state where the target blown air temperature TAO is equal to or lower than the predetermined temperature, the defrosting operation is performed.

Figure 9:
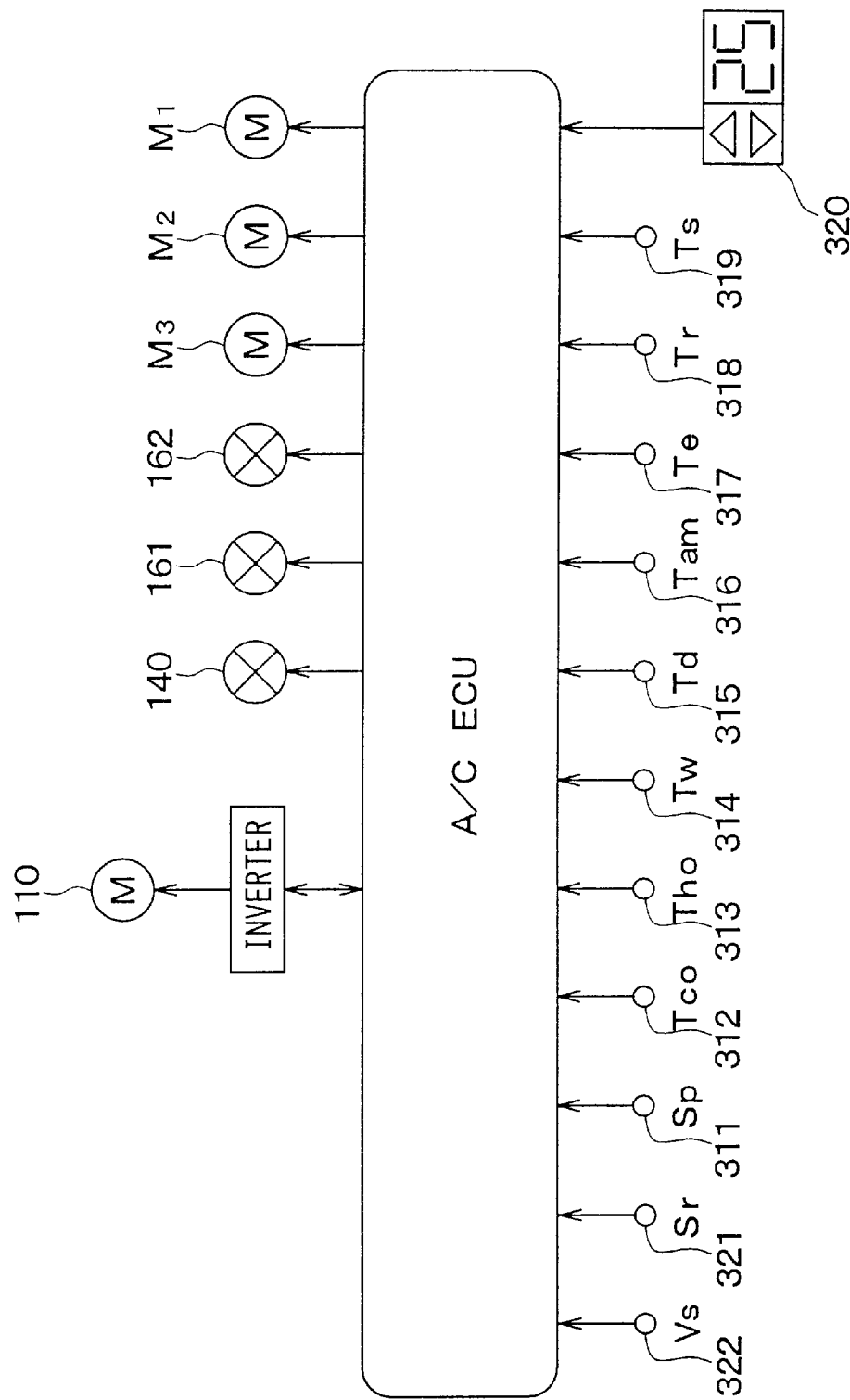
FIG. 9 is a schematic diagram showing the air conditioner according to the fourth embodiment.

In a case where cooling water for cooling the engine is supplied to the heater core 210, as shown in FIG. 9, a rotation speed detection unit 321 for detecting a rotation speed Sr of the engine can be provided, as shown in FIG. 9. In this case, when the rotation speed Sr of the engine is higher than a predetermined rotation speed, it can be determined that the temperature of the cooling water is sufficiently high, and it can be determined that the heating capacity of the heater core 210 is sufficient at step S460.

The rotation speed Sr is detected by a rotation speed detection means 321, and it is inputted into the ECU 310 as shown in FIG. 9. Here, the predetermined rotation speed may include the zero rotation speed, and the heating capacity of the heater core 210 may be determined to always be sufficient when the engine is driven.

When the outside air temperature Tam described in the first embodiment is equal to or higher than a predetermined temperature, a heating load on the heater core 210 can be determined to be sufficiently low, and it can be determined that the heating capacity of the heater core 210 is sufficient at step S460. Alternatively, when the inside air temperature Tr is equal to or higher than a predetermined temperature, it can be determined that the heating capacity of the heater core 210 is sufficient at step S460.

As a vehicle speed Vs becomes higher, a vehicle body is further cooled by vehicle travelling wind, thereby increasing a heating load on the heater core 210. In an outside air introduction mode where outside air is introduced from the outside air introduction port 302, as the vehicle speed Vs becomes higher, the ram pressure further increases. Therefore, a larger amount of cool outside air is introduced into the passenger compartment, and the heating load on the heater core 210 is increased. Accordingly, a speed detection unit 322 is provided as shown in FIG. 9, and a vehicle speed Vs detected by the speed detection unit 322 is inputted into the ECU 310. When the detection vehicle speed Vs is equal to or lower than a predetermined speed, it can be determined that the heating capacity of the heater core 210 is sufficient at step S460. Here, the predetermined speed may include zero km/hour. Accordingly, the heating capacity of the heater core 210 may be always determined to be sufficient when the vehicle is stopped, for example. Further, when a predetermined time passes after starting the operation of the engine, it can be determined that the heating capacity of the heater core 210 is sufficient at step S460.

(Fifth Embodiment)

Figure 10:
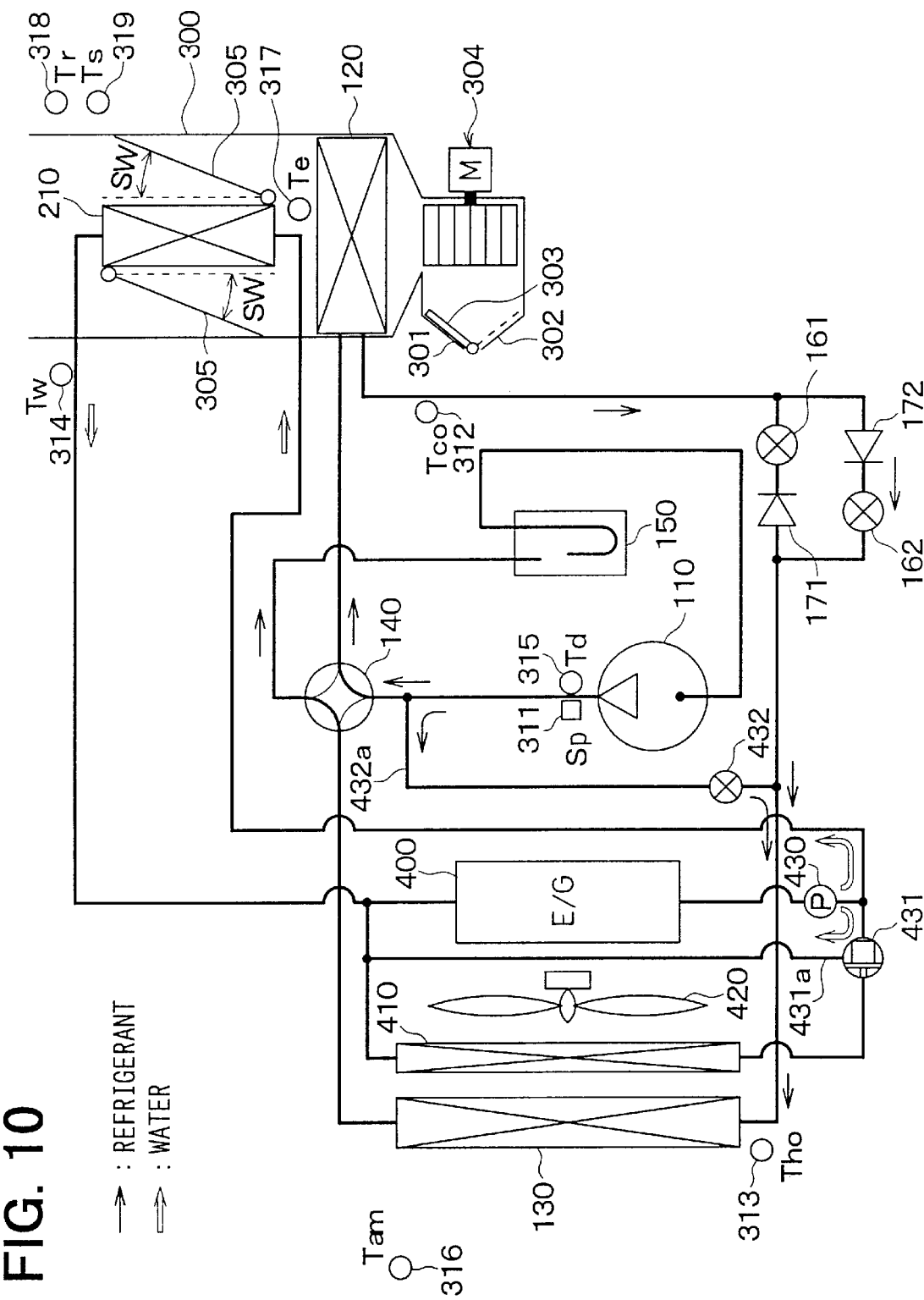
FIG. 10 is a schematic diagram showing an air conditioner in a defrosting operation according to a fifth preferred embodiment of the present invention.

In the defrosting operation of the above-described first to third embodiments, refrigerant circulates from the compressor 110 to the compressor 110 through the exterior heat exchanger 130, the cooling decompression device 161, the interior heat exchanger 120 and the accumulator 150 in this order, similarly to that in the cooling operation. In the defrosting operation of the fifth embodiment, as shown in FIG. 10, refrigerant circulates from the compressor 110 to the compressor 110 through the interior heat exchanger 120, the heating decompression device 162, the exterior heat exchanger 130 and the accumulator 150 in this order. At the same time, a part of refrigerant flows from the compressor 110 toward the exterior heat exchanger 130 while bypassing the interior heat exchanger 120.

That is, in the fifth embodiment, a refrigerant bypass passage 432a, through which refrigerant discharged from the compressor 110 flows to the exterior heat exchanger 130 while bypassing the interior heat exchanger 120, is provided, and a solenoid valve 432 is disposed in the refrigerant bypass passage 432a. When the defrosting operation is performed in the heating operation using the heat pump cycle 100, a part of refrigerant flowing from the compressor 110 toward the interior heat exchanger 120 flows through the refrigerant bypass passage 432a by opening the solenoid valve 432.

Because high-temperature and high-pressure gas refrigerant discharged from the compressor 110 flows into the exterior heat exchanger 130, the defrosting operation can be made by heat of this gas refrigerant. That is, in the fifth embodiment, the defrosting operation can be performed while a heating supplement due to the heater pump cycle 100 is performed.

Although cooling water of the fuel cell 200 is supplied to the heater core 210 in the above-described first to third embodiments, cooling water of an engine 400 (E/G) is supplied to the heater core 210 in the fifth embodiment. That is, in the fifth embodiment, the present invention is typically applied to a vehicle having the engine 400 (E/G).

In FIG. 10, an electric water pump (electric pump) 430 is disposed to circulate cooling water in a cooling water circuit of the engine 400. In the fifth embodiment, a mechanical water pump (mechanical pump), for circulating cooling water in the cooling water circuit of the engine 400, is also provided separately from the electric pump 430. A rotation of a crankshaft of the engine 400 is transmitted to the mechanical pump through a belt or the like, so that the mechanical pump is mechanically driven by the engine 400. In the present invention, either of the electric pump 430 and the mechanical pump can be provided. As shown in FIG. 10, a radiator 410 for cooling the cooling water from the engine 400 is provided and a blower 420 for blowing outside air toward the radiator 410 is provided.

In FIG. 10, a water bypass passage 431a through which cooling water bypasses the radiator 410 is provided, and a thermal valve 431 is disposed to adjusts a cooling water amount flowing through the water bypass passage 431a and a cooling water amount flowing through the radiator 410. By the operation of the thermal valve 431, the engine 400 can be set at a predetermined temperature.

(Sixth Embodiment)

Figure 11:
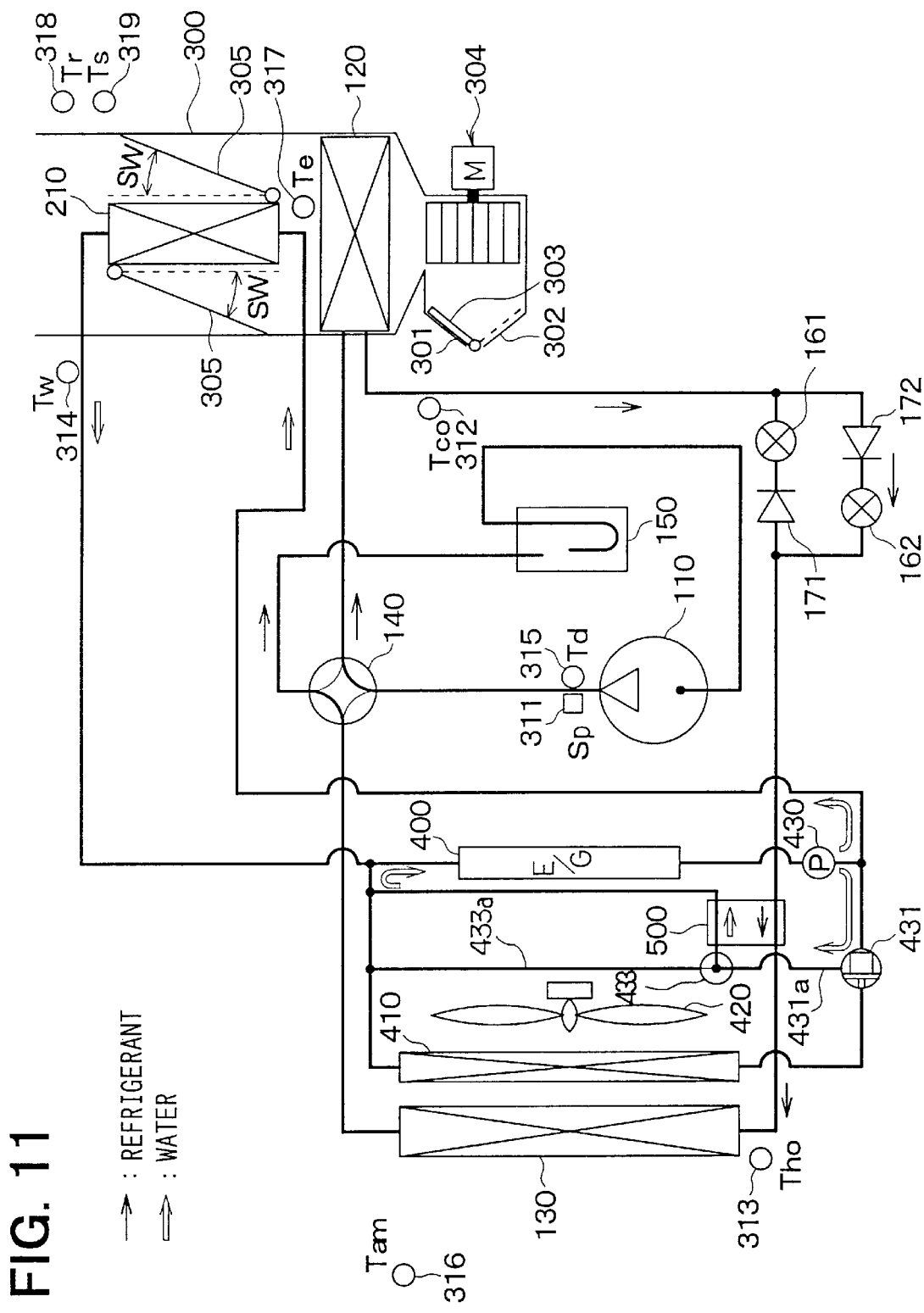
FIG. 11 is a schematic diagram showing an air conditioner in a defrosting operation according to a sixth preferred embodiment of the present invention.

In the sixth embodiment, a water-refrigerant heat exchanger (refrigerant heating means) 500 is disposed in the water bypass passage 431a described in the fifth embodiment. In the defrosting operation of the sixth embodiment, refrigerant circulates from the compressor 110 to the compressor 110 through the interior heat exchanger 120, the heating decompression device 162, the exterior heat exchanger 130 and the accumulator 150 in this order. At this time, refrigerant flowing into the exterior heat exchanger 130 is heated by the water-refrigerant heat exchanger 500. In FIG. 11, a three-way switching valve 433 is disposed to switch a case where cooling water flowing into the water bypass passage 431a flows into the water-refrigerant heat exchanger 500, or a case where cooling water flowing into the water bypass passage 431a flows through the water bypass passage 433a while bypassing the water-refrigerant heat exchanger 500.

(Seventh Embodiment)

Figure 12:
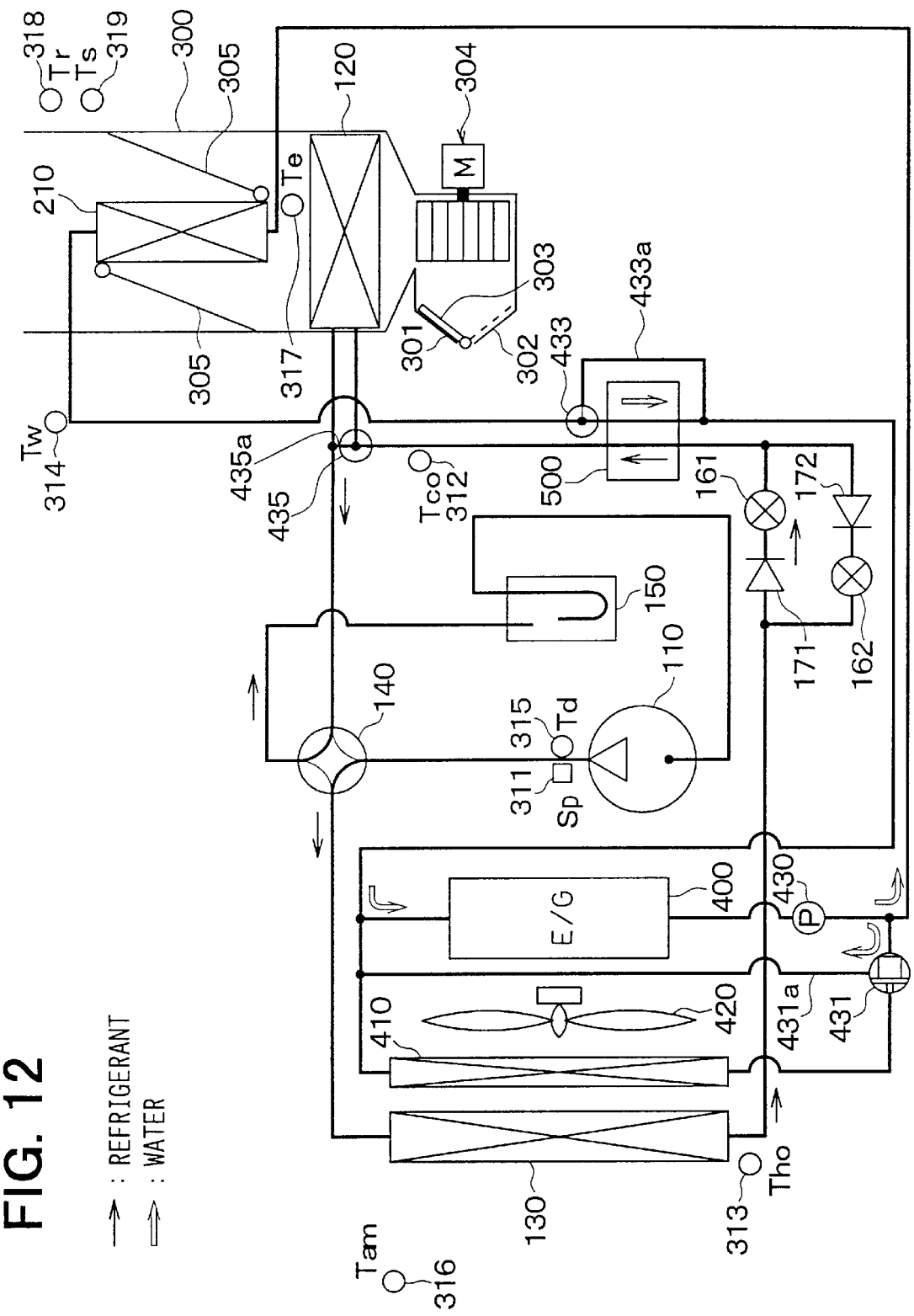
FIG. 12 is a schematic diagram showing an air conditioner in a defrosting operation according to a seventh preferred embodiment of the present invention.

In the above-described sixth embodiment of the present invention, the water-refrigerant heat exchanger 500 is disposed in the water bypass passage 431a. However, in the seventh embodiment of the present invention, the water-refrigerant heat exchanger 500 is disposed in a water passage through which cooling water flows from the heater core 210 to the engine 400, as shown in FIG. 12. In the seventh embodiment, the water-refrigerant heat exchanger 500 heats refrigerant flowing from the cooling decompression device 161 to the interior heat exchanger 120 by performing a heat exchange between cooling water flowing from the heater core 210 to the engine 400 and the refrigerant flowing from the cooling decompression device 161 to the interior heat exchanger 120.

In the defrosting operation of the seventh embodiment, refrigerant circulates from the compressor 110 to the compressor 110 through the exterior heat exchanger 130, the cooling decompression device 161, the interior heat exchanger 120 and the accumulator 150 in this order. At this time, refrigerant flowing into the interior heat exchanger 120 is heated by the water-refrigerant heat exchanger 500. The water bypass passage 433a is provided so that cooling water from the heater core 210 bypasses the water-refrigerant heat exchanger 500.

In the defrosting operation, as shown in FIG. 12, refrigerant flowing out from the cooling decompression device 161 can flow into a refrigerant bypass passage 435a while bypassing the interior heat exchanger 120 by a switching operation of a three-way switching valve 435.

(Eighth Embodiment)

In the above-described seventh embodiment of the present invention, the water-refrigerant heat exchanger 500 is disposed to heat refrigerant flowing from the cooling decompression device 161 toward the interior heat exchanger 120. However, in the eighth embodiment of the present invention, the water-refrigerant heat exchanger 500 is disposed to heat refrigerant flowing from the exterior heat exchanger 130 toward the accumulator 150 (interior heat exchanger 120), as shown in FIG. 13.

In the defrosting operation of the eighth embodiment, refrigerant circulates from the compressor 110 to the compressor 110 through the interior heat exchanger 120, the heating decompression device 162, the exterior heat exchanger 130 and the accumulator 150 in this order. At this time, the water-refrigerant heat exchanger 500 heats refrigerant flowing from the exterior heat exchanger 130 toward the accumulator 150.

Figure 13:
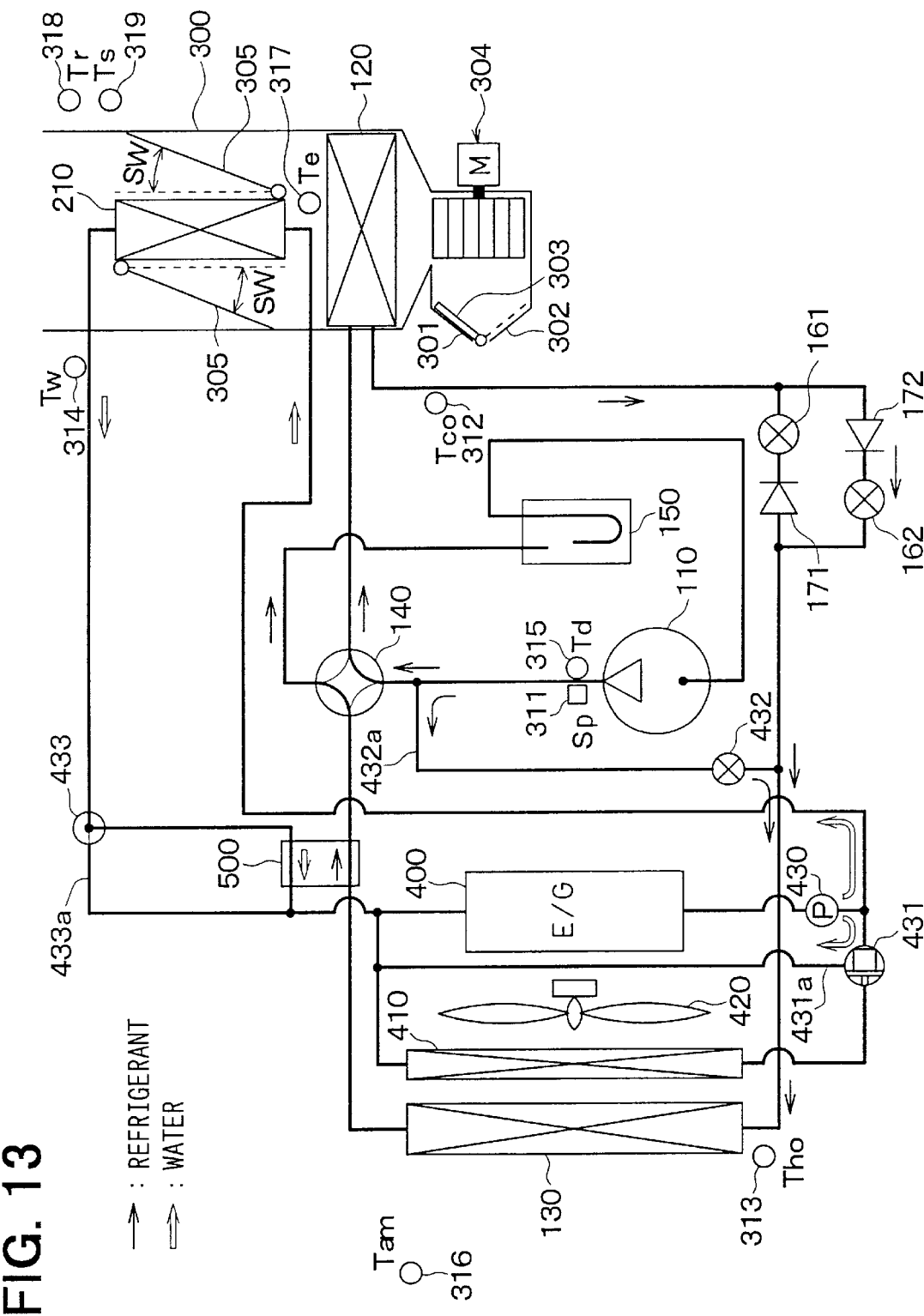
FIG. 13 is a schematic diagram showing an air conditioner in a defrosting operation according to an eighth preferred embodiment of the present invention.

In FIG. 13, the three-way switching valve 433 is disposed to switch a case where cooling water from the interior heat exchanger 210 flows into the water-refrigerant heat exchanger 500 or a case where cooling water flows through the water bypass passage 433a while bypassing the water-refrigerant heat exchanger 500.

(Ninth Embodiment)

In the defrosting operation of the ninth embodiment, the temperature of cooling water is increased by reducing the flow amount of cooling water flowing through the engine 400, so that the heating capacity of the heater core 210 is improved.

Figure 14:
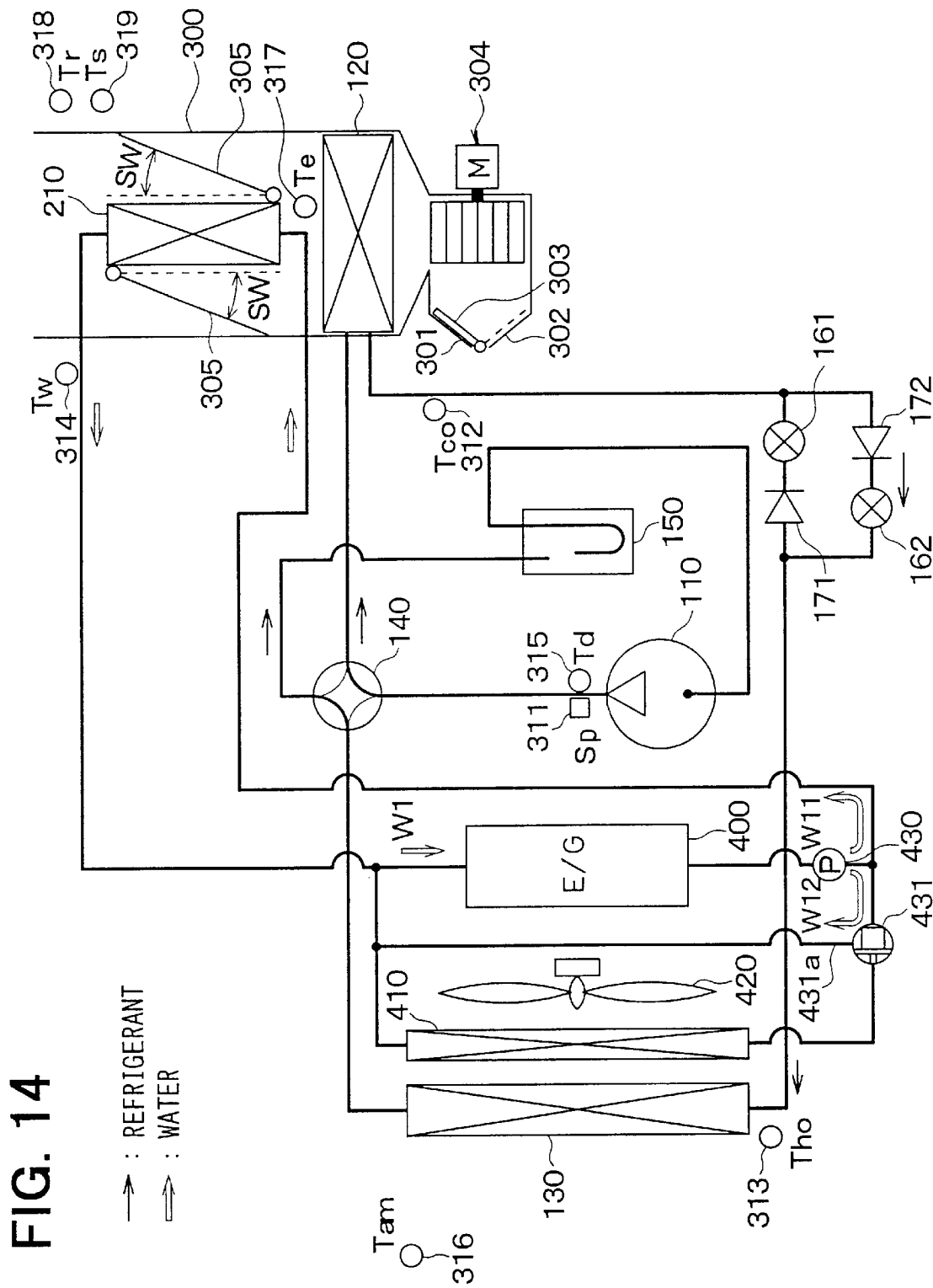
FIG. 14 is a schematic diagram showing an air conditioner in a heating operation according to a ninth preferred embodiment of the present invention.
Figure 15:
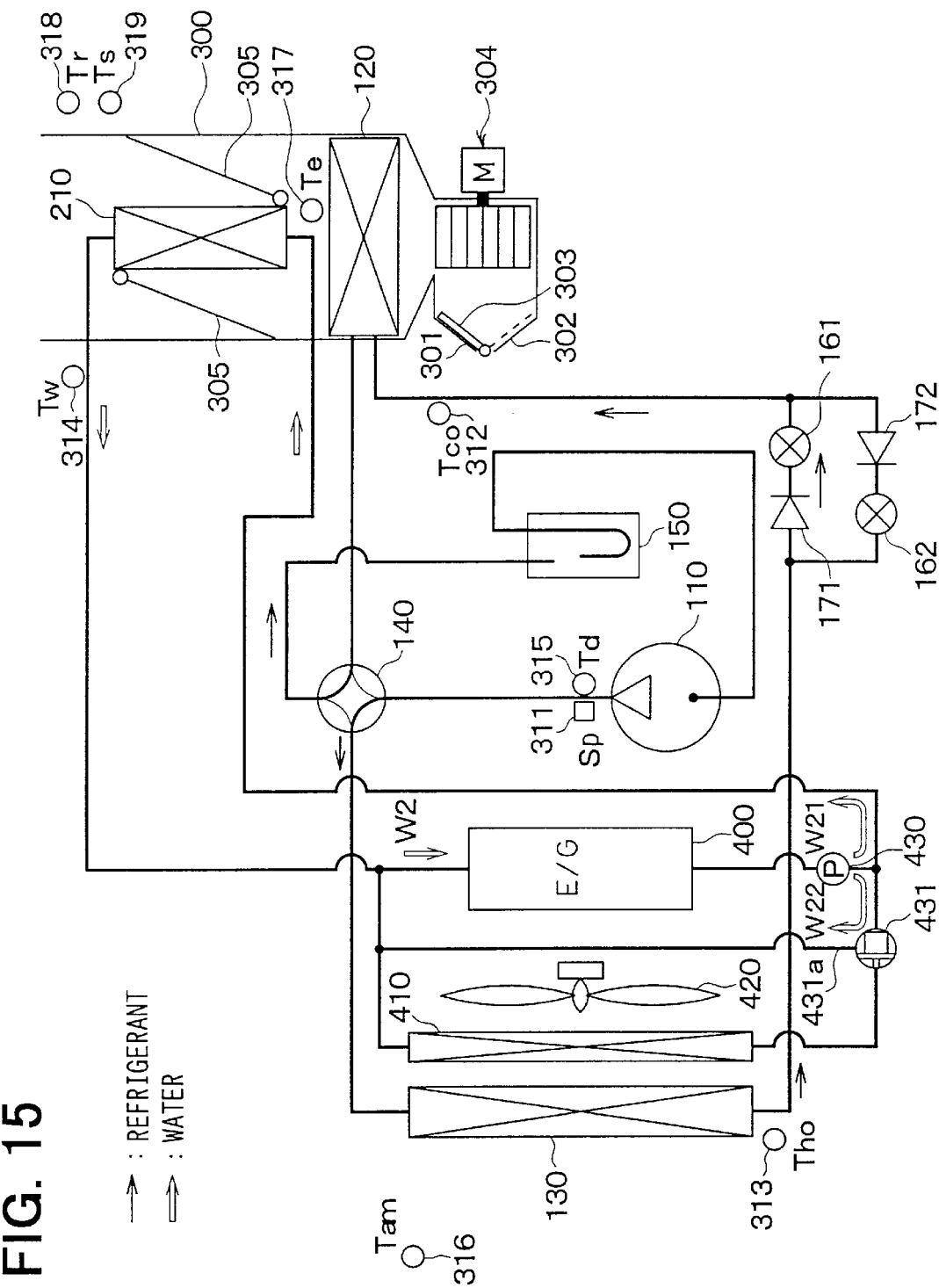
FIG. 15 is a schematic diagram showing the air conditioner in a defrosting operation, according to the ninth embodiment.
Figure 16:
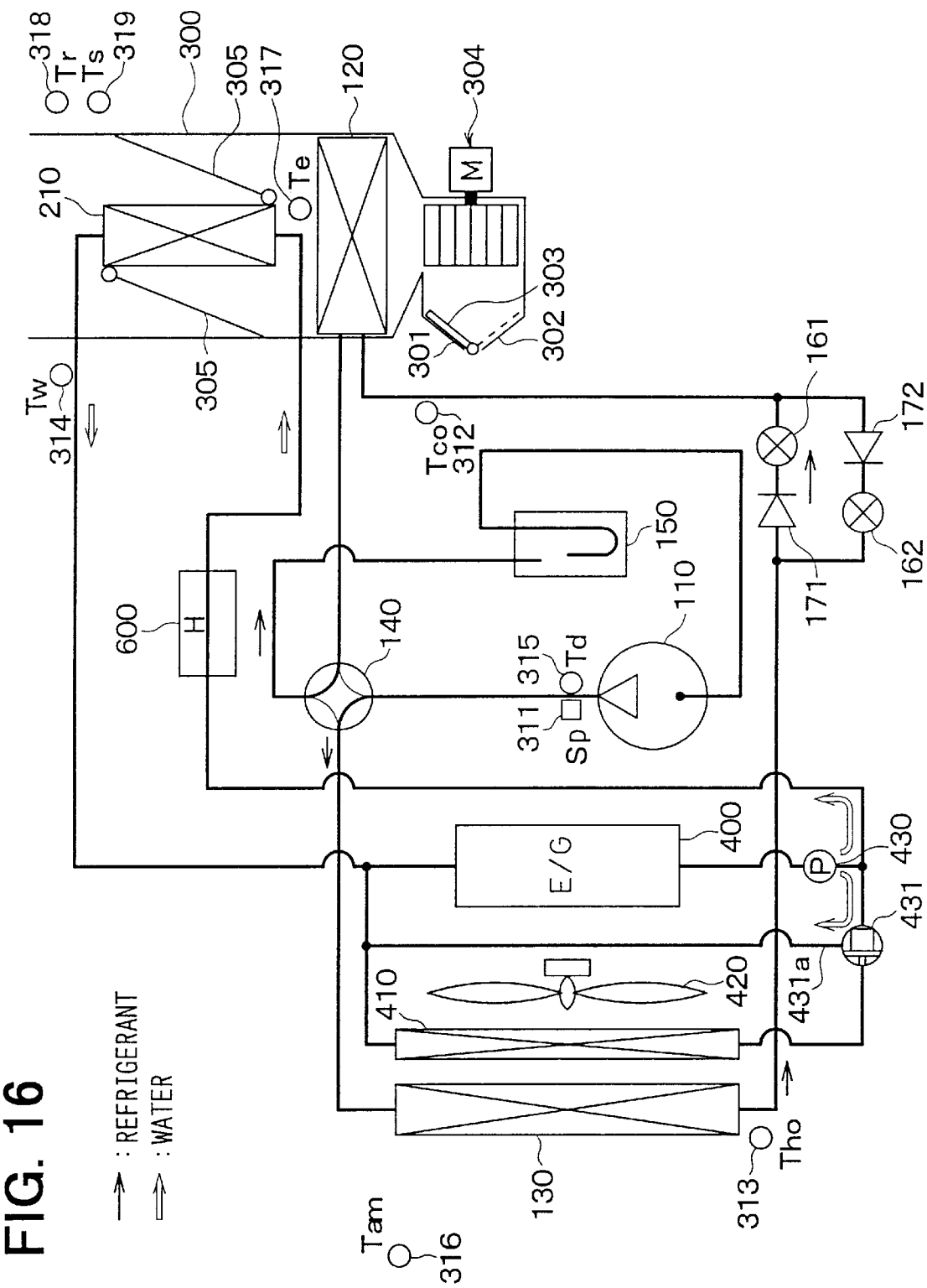
FIG. 16 is a schematic diagram showing an air conditioner in a defrosting operation, according to a tenth preferred embodiment of the present invention.

In the heating operation of the ninth embodiment, as shown in FIG. 14, refrigerant circulates from the compressor 110 to the compressor 110 through the interior heat exchanger 120, the heating decompression device 162, the exterior heat exchanger 130 and the accumulator 150 in this order. Further, as shown in FIG. 15, in the defrosting operation, refrigerant circulates from the compressor 110 to the compressor 110 through the exterior heat exchanger 130, the cooling decompression device 161, the interior heat exchanger 120 and the accumulator 150 in this order.

Further, a flow amount W2 of cooling water flowing into the engine 400 in the defrosting operation is made to be smaller than a flow amount W1 of cooling water flowing into the engine 400 in the heating operation (W1>W2). Accordingly, a flow amount W22 of cooling water flowing from the engine 400 to a side of the radiator 410 in the defrosting operation is made to be smaller than a flow amount W12 in the heating operation (W12>W22). Further, a flow amount W21 of cooling water flowing from the engine 400 to a side of the heater core 210 in the defrosting operation is made to be smaller than that W11 in the heating operation (W11>W21).

(Tenth Embodiment)

In the tenth embodiment, a heater 600 for heating cooling water is provided, and the heating capacity of the heater core 210 is increased by heating cooling water using the heater 600 in the defrosting operation.

In the defrosting operation of the tenth embodiment, refrigerant circulates from the compressor 110 to the compressor 110 through the exterior heat exchanger 130, the cooling decompression device 161, the interior heat exchanger 120 and the accumulator 150 in this order. In this case, cooling water flowing into the heater core 210 from the engine 400 is heated by the heater 600.

When the frosting on the surface of the exterior heat exchanger is determined, the flow amount of the cooling water can be decreased so that the heating capacity of the heater core 210 is increased. Alternatively, when the frosting on the surface of the exterior heat exchanger 130 is determined, the rotation speed of the engine 400 can be increased so that the heating capacity of the heater core 210 is increased. Alternatively, when the frosting on the surface of the exterior heat exchanger 130 is determined, the flow amount of the cooling water can be decreased so that the heating capacity of the heater core 210 is increased. Alternatively, when the frosting on the surface of the exterior heat exchanger 130 is determined, the operation of the blower 420 can be stopped so that the heating capacity of the heater core 210 is increased. Alternatively, in a vehicle having the fuel cell 200, when the frosting on the surface of the exterior heat exchanger is determined, the output of the fuel cell can be increased so that the heating capacity of the heater core 210 is increased.

(Eleventh Embodiment)

Figure 17:
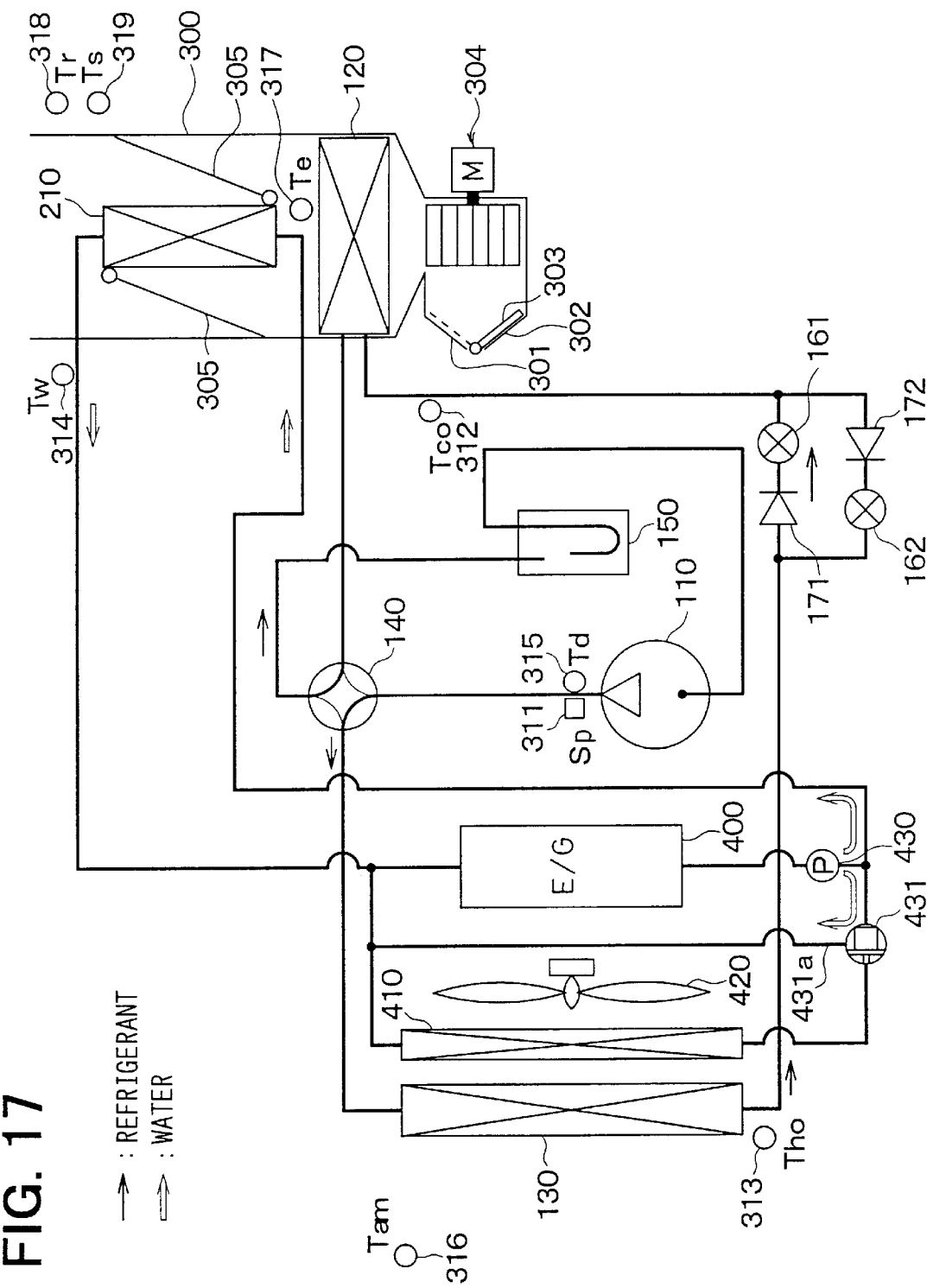
FIG. 17 is a schematic diagram showing an air conditioner in a defrosting operation, according to an eleventh preferred embodiment of the present invention.

In the defrosting operation of the eleventh embodiment, as shown in FIG. 17, refrigerant circulates from the compressor 110 to the compressor 110 through the exterior heat exchanger 130, the cooling decompression device 161, the interior heat exchanger 120 and the accumulator 150 in this order. In the defrosting operation, the inside/outside air switching door 303 is operated at a position indicated by the solid line in FIG. 17, so that an inside air introduction mode where inside air is introduced from the inside air introduction port 301 is set. Similarly, in the defrosting operation, a ratio of an inside air amount to an outside air amount can be increased. In this operation, because inside air is dehumidified by the interior heat exchanger 120, it can prevent a windshield from being clouded (fogged).

Although the present invention has been fully described in connection with the preferred embodiments thereof with reference to the accompanying drawings, it is to be noted that various changes and modifications will become apparent to those skilled in the art.

The present invention is applied to a vehicle with a fuel cell in the first to third embodiments, or an engine-driving vehicle in the fifth to eleventh embodiments. Without limited to these, however, the present invention can be applied to an electric vehicle using a secondary cell such as a battery as a power source, a vehicle having a heat engine such as a gasoline engine and a diesel engine, and the like. A waste heat source is not limited to the fuel cell 200 and the engine 400, but it can be an electric circuit such as an inverter circuit and a heat generating apparatus such as a heat engine.

In the above-described embodiments, a switching operation of the refrigerant flow can be performed using plural refrigerant pipes and plural solenoid valves in place of the four-way switching valve 140. Although the compressor 110 is driven by electric power in the above-described embodiments, it can be driven by the engine 400. Although the air mixing door 305 is adopted as the air temperature adjusting means in the above embodiments, well-known reheating means for adjusting a flow amount of hot water to be supplied to the heater core 210 can be adopted.

Such changes and modifications are to be understood as being within the scope of the present invention as defined by the appended claims.

What is claimed is:

1. An air conditioner for a vehicle having a passenger compartment, comprising:

a heater pump cycle including a compressor for compressing and discharging refrigerant, an interior heat exchanger for performing a heat exchange between refrigerant and air blown into the passenger compartment, and an exterior heat exchanger for performing a heat exchange between refrigerant and outside air outside the passenger compartment;

a heat core for heating air blown into the passenger compartment by performing a heat exchange between air and a fluid which recovers waste heat generated in the vehicle;

frosting determination means for determining whether a surface of the exterior heat exchanger is frosted;

heating capacity determining means for determining whether a heating capacity of the heater core is larger than a predetermined capacity; and a control unit for controlling operation of the heat pump cycle, wherein:

at least when the frosting determination means determines a frosting on the surface of the exterior heat exchanger, and when the heating capacity determining means determines that the heating capacity of the heater core is larger than the predetermined capacity, the control unit performs a defrosting operation in which the surface of the exterior heat exchanger is defrosted.

2. The air conditioner according to claim 1, further comprising a fluid temperature detecting unit for detecting a temperature of the fluid supplied to the heater core, wherein, when the temperature of the fluid, detected by the fluid temperature detecting unit is higher than a predetermined temperature, the heating capacity determining means determines that the heating capacity of the heater core is larger than the predetermined capacity.

3. The air conditioner according to claim 1, further comprising a vehicle speed detecting unit for detecting a vehicle speed, wherein, the control unit performs the defrosting operation when the vehicle speed is higher than a predetermined speed.

4. The air conditioner according to claim 1, further comprising a vehicle speed detecting unit for detecting a vehicle speed, wherein, the control unit performs the defrosting operation when the vehicle speed is higher than a first predetermined speed and a lower than a second predetermined speed that is larger than the first predetermined speed.

5. The air conditioner according to claim 1, further comprising air temperature adjusting means for adjusting temperature of air blown into the passenger compartment by adjusting a heating degree due to the heater core, wherein, when the air temperature adjusting means adjusts the heating degree at the maximum degree, the heating capacity determining means determines that the heating capacity of the heater core is lower than the predetermined capacity.

6. The air conditioner according to claim 1, further comprising:

target air temperature calculating means for calculating a target temperature of air blown into the passenger compartment, wherein, when the target temperature of air blown into the passenger compartment is lower than a predetermined temperature, the heating capacity determining means determines that the heating capacity is larger than the predetermined capacity.

7. The air conditioner according to claim 1, further comprising:

an outside air detecting unit for detecting temperature of outside air, wherein, when the temperature of the outside air is higher than a predetermined temperature, the heating capacity determining means determines that the heating capacity is larger than the predetermined capacity.

8. The air conditioner according to claim 1, further comprising:

an inside air temperature detecting unit for detecting temperature of inside air inside the passenger compartment, wherein, when the temperature of the inside air is higher than a predetermined temperature, the heating capacity determining means determines that the heating capacity is larger than the predetermined capacity.

9. The air conditioner according to claim 1, further comprising:

a vehicle speed detecting unit for detecting a vehicle speed, wherein, when the vehicle speed is lower than a predetermined speed, the heating capacity determining means determines that the heating capacity is larger than the predetermined capacity.

10. The air conditioner according to claim 1, wherein the fluid supplied to the heater core is cooling water for cooling one of an engine and a fuel cell mounted on the vehicle.

11. The air conditioner according to claim 1, wherein the fluid supplied to the heater core is cooling water for cooling an engine of the vehicle, the air conditioner further comprising a radiator for cooling the cooling water by performing a heat exchange between the cooling water and outside air, wherein, when the cooling water is cooled in the radiator, the heating capacity determining means determines that the heating capacity is larger than the predetermined capacity.

12. The air conditioner according to claim 1, wherein the fluid supplied to the heater core is cooling water for cooling an engine mounted on the vehicle, the air conditioner further comprising a rotation speed detecting unit for detecting a rotation speed of the engine, wherein, when the rotation speed of the engine is higher than a predetermined speed, the heating capacity determining means determines that the heating capacity is larger than the predetermined capacity.

13. The air conditioner according to claim 1, wherein:

the fluid supplied to the heater core is cooling water for cooling an engine mounted on the vehicle;

when a passed time from a start of the engine is larger than a predetermined time, the heating capacity determining means determines that the heating capacity is larger than the predetermined capacity.

14. The air conditioner according to claim 1, wherein, in the defrosting operation, the heat pump cycle is controlled to be operated in such a manner that heat of refrigerant is radiated in the exterior heat exchanger and is absorbed in the interior heat exchanger.

15. The air conditioner according to claim 1, wherein:

in a heating operation for heating the passenger compartment, the control unit controls the heat pump cycle in such a manner that refrigerant discharged from the compressor flows into the exterior heat exchanger after passing through the interior heat exchanger; and in the defrosting operation, a part of refrigerant flowing from a discharge side of the compressor directly flows into the exterior heat exchanger while bypassing the interior heat exchanger.

16. The air conditioner according to claim 1, further comprising a refrigerant heating unit in which the fluid is heat-exchanged with refrigerant to heat refrigerant, wherein the defrosting operation is performed by heating refrigerant using the refrigerant heating unit.

17. The air conditioner according to claim 1, wherein the interior heat exchanger is disposed at an upstream air side of the heater core.

18. The air conditioner according to claim 1, wherein:

the heat pump cycle further includes a four-way switching valve for switching a refrigerant flow in the heat pump cycle; and the four-way switching valve is disposed to switch one of a cooling operation where heat of refrigerant is radiated in the exterior heat exchanger and is absorbed in the interior heat exchanger, and a heating operation where heat of refrigerant is radiated in the interior heat exchanger and is absorbed in the exterior heat exchanger.

19. The air conditioner according to claim 1, wherein the compressor is an electrical compressor driven by electrically.

20. The air conditioner according to claim 1, further comprising:

a temperature detecting unit for detecting temperature of the fluid supplied into the heater core; and an air temperature adjusting unit which adjusts a heating degree due to the heater core based on the temperature detected by the temperature detecting unit, to adjust temperature of air blown into the passenger compartment.

* * * * *